(12) United States Patent
Hosoi et al.

(10) Patent No.: US 10,943,613 B1
(45) Date of Patent: Mar. 9, 2021

(54) THERMALLY ASSISTED MAGNETIC HEAD, HEAD GIMBAL ASSEMBLY, HARD DISK DRIVE AND METHOD OF MANUFACTURING THE THERMALLY ASSISTED MAGNETIC HEAD

(71) Applicants: SAE Magnetics (H.K.) Ltd., Hong Kong (HK); Headway Technologies, Inc., Milpitas, CA (US)

(72) Inventors: Ryo Hosoi, Hong Kong (HK); Takashi Honda, Hong Kong (HK); Seiichi Takayama, Hong Kong (HK); Sik Fun Chan, Hong Kong (HK); Tai Boon Lee, Hong Kong (HK); Dayu Zhou, Milpitas, CA (US)

(73) Assignees: SAE Magnetics (H.K.) Ltd., Hong Kong (HK); Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 16/817,705

(22) Filed: Mar. 13, 2020

(51) Int. Cl.
| G11B 5/60 | (2006.01) |
| G11B 5/31 | (2006.01) |
| G11B 5/48 | (2006.01) |
| G11B 5/39 | (2006.01) |
| G11B 5/00 | (2006.01) |

(52) U.S. Cl.
CPC ............ G11B 5/4826 (2013.01); G11B 5/314 (2013.01); G11B 5/3133 (2013.01); G11B 5/3906 (2013.01); G11B 5/60 (2013.01); G11B 5/6005 (2013.01); G11B 5/6088 (2013.01); G11B 2005/0021 (2013.01)

(58) Field of Classification Search
None
See application file for complete search history.

(56) References Cited

U.S. PATENT DOCUMENTS

| 7,957,085 | B2* | 6/2011 | Tanaka | G11B 5/4826 360/59 |
| 8,243,561 | B2* | 8/2012 | Matsumoto | G11B 5/314 369/13.33 |
| 8,270,262 | B2* | 9/2012 | Naniwa | G11B 5/4826 369/30.03 |
| 9,013,967 | B1* | 4/2015 | Nakamura | G11B 5/105 369/13.32 |
| 9,830,937 | B1* | 11/2017 | Hipwell, Jr. | G11B 5/4866 |
| 9,947,358 | B1 | 4/2018 | Cheng et al. | |

(Continued)

FOREIGN PATENT DOCUMENTS

JP 2012084216 A 4/2012

*Primary Examiner* — Jefferson A Evans

(57) ABSTRACT

A thermally assisted magnetic head including a slider and a light source-unit. The slider includes a slider substrate and a magnetic head part. The light source-unit includes a laser diode and a sub-mount. The magnetic head part includes a medium-opposing surface, a light source-opposing surface and a waveguide which guides laser light from the light source-opposing surface to the medium-opposing surface. The slider substrate includes a light source-cavity formed in a light source-placing surface on which the light source-unit is placed. The light source-cavity includes an opening concave part being formed larger than a mount bottom surface of the sub-mount. The mount bottom surface of the sub-mount is inserted into the opening concave part to be joined to the light source-cavity.

17 Claims, 33 Drawing Sheets

(56) References Cited

U.S. PATENT DOCUMENTS

| | | | |
|---|---|---|---|
| 10,176,833 B1* | 1/2019 | Hipwell, Jr. | G11B 5/4826 |
| 2011/0205661 A1 | 8/2011 | Komura et al. | |
| 2011/0266469 A1* | 11/2011 | Goulakov | G11B 5/105 |
| | | | 250/505.1 |
| 2012/0155232 A1 | 6/2012 | Schreck et al. | |
| 2013/0279311 A1* | 10/2013 | Hurley | B23K 1/0008 |
| | | | 369/13.02 |
| 2013/0279312 A1* | 10/2013 | Hurley | G11B 5/6088 |
| | | | 369/13.02 |
| 2014/0043948 A1* | 2/2014 | Hirata | G11B 5/314 |
| | | | 369/13.24 |
| 2015/0049595 A1* | 2/2015 | Smith | G11B 5/6088 |
| | | | 369/13.33 |
| 2015/0146507 A1* | 5/2015 | Boone, Jr. | G11B 5/314 |
| | | | 369/13.32 |
| 2015/0154988 A1 | 6/2015 | Takei et al. | |
| 2015/0213819 A1* | 7/2015 | Gokemeijer | G11B 5/4866 |
| | | | 369/13.13 |
| 2015/0333476 A1* | 11/2015 | Zhong | H01L 24/32 |
| | | | 438/26 |
| 2015/0364899 A1 | 12/2015 | Tatah et al. | |
| 2015/0380035 A1 | 12/2015 | Takei et al. | |
| 2017/0256277 A1* | 9/2017 | Peng | G11B 5/314 |
| 2018/0040344 A1* | 2/2018 | Hutchinson | G11B 5/4866 |
| 2018/0211685 A1* | 7/2018 | Mehfuz | G02B 6/125 |

* cited by examiner

Fig.32
PRIOR ART
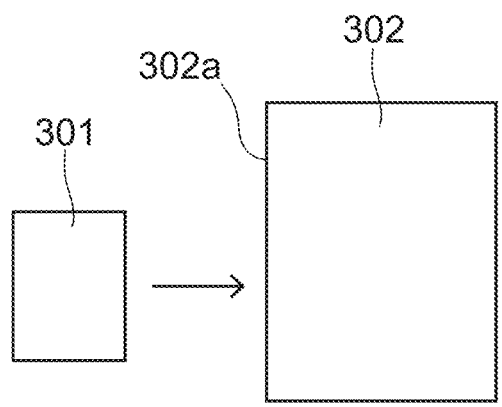
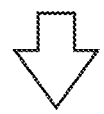
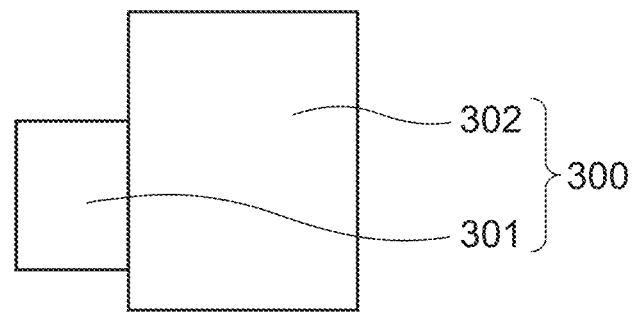

THERMALLY ASSISTED MAGNETIC HEAD, HEAD GIMBAL ASSEMBLY, HARD DISK DRIVE AND METHOD OF MANUFACTURING THE THERMALLY ASSISTED MAGNETIC HEAD

BACKGROUND

Field of the Invention

The present invention relates to a thermally assisted magnetic head recording data on a magnetic recording medium by thermally assisted magnetic recording using near-field light, a head gimbal assembly, a hard disk drive each having the thermally assisted magnetic head, and a method of manufacturing the thermally assisted magnetic head.

Related Background Art

In recent years, as magnetic disk drives have been increasing their recording densities, thin-film magnetic heads recording data on a magnetic recording media have been required to further improve their performances. As the thin-film magnetic heads, those of composite type having a structure in which a reproducing head having a magnetoresistive device (hereinafter, referred to also as an "MR device") for read and a recording head having an electromagnetic coil device for write are laminated have been conventionally in wide use. In a magnetic disk drive, the thin-film magnetic head is provided on a slider which very slightly floats from the magnetic recording medium.

Incidentally, the magnetic disk drive records data by magnetizing magnetic fine particles on the magnetic recording medium using the recording head. In order to increase the recording density of the magnetic recording medium, it is effective to make the magnetic fine particles smaller.

When the magnetic fine particles are made smaller, however, there arises a problem that the magnetization thereof becomes unstable with respect to heat as the particles reduce in volume, thereby increasing the possibility that the data recorded on the magnetic recording medium is lost. To solve the problem, it is effective to increase the magnetic energy of the magnetic fine particles to thereby enhance the stability of magnetization. When the magnetic energy of the magnetic fine particles is increased, however, there arises another problem that the coercive force (difficulty in reversing magnetization) of the magnetic recording medium increases to deteriorate the data recording performance.

To solve such problems, a method called thermally assisted magnetic recording has been conventionally proposed. When recording data on a magnetic recording medium having a large coercive force, the thin-film magnetic head employing the thermally assisted magnetic recording (hereinafter, referred to as a "thermally assisted magnetic head") records data while instantaneously heating and thereby increasing the temperature of a portion of the magnetic recording medium where data will be recorded.

Since the magnetic fine particles decrease in coercive force when the temperature is increased, instantaneous heating makes it possible to record data even on the magnetic recording medium having a high coercive force at room temperature. The portion of the magnetic recording medium where the data has been recorded is decreased in temperature after the recording of data and thereby increases in coercive force. Therefore, by using the thermally assisted magnetic head, it becomes possible to make the magnetic fine particles finer as well as stabilize recording in the magnetic disk drive.

On the other hand, near-field light is used as means for heating the magnetic recording medium in the conventional thermally assisted magnetic head. When light enters an opening smaller than the wavelength of light, the light slightly seeps from the opening and locally exists near the opening. The light locally existing near the opening is called near-field light. The near-field light is confined in a region much smaller than that of a spot light obtained by collecting light using a lens, so that use of the near-field light makes it possible to heat only a limited extremely small recording region of the magnetic recording medium. A conventional technology concerning the thermally assisted magnetic recording is disclosed in, for example, US 2012-0155232 (also called patent document 1).

By the way, in the thermally assisted magnetic head, because the recording head is formed on the slider, the structure, which laser light for generating the near-field light is guided to the medium-opposing surface of the slider, is important. The following structure is conventionally known as the structure.

The structure which the light source is provided on the surface of the slider (see for example, US2015-0364899 (also called patent document 2), US2011-0205661 (also called patent document 3), US2015-154988 (also called patent document 4), US 2015-0380035 (also called patent document 5), JP2012-084216 (also called patent document 6), U.S. Pat. No. 9,947,358 (also called patent document 7). The structure, which the light source is provided on the surface of the slider, is also referred to as "light source-mounting structure", as following.

SUMMARY OF THE INVENTION

There is a following problem in the thermally assisted magnetic head, having the above-described conventional light source-mounting structure. For example, there is a following problem in a thermally assisted magnetic head 400, illustrated in FIG. 31. The thermally assisted magnetic head 400 has a light source-unit 300 and a slider 330. The light source-unit 300 has a laser diode 301 as a light source, a member 302 which is called a sub-mount. The slider 330 has a slider substrate 310 and a magnetic head part 320, which is formed on the slider substrate 310.

Then, as illustrated in FIG. 32, the laser diode 301 is joined to the sub-mount 302, thereby the light source-unit 300 is constituted. In this case, the laser diode 301 is joined on a surface 302a of the sub-mount 302 with solder. Thereby, the light source-unit 300, which the laser diode 301 is united with the sub-mount 302, is obtained.

After that, as illustrated in FIG. 31, the light source-unit 300 is adhered to the slider 330. Thereby, the thermally assisted magnetic head 400, which the light source-unit 300 is united with the slider 330, is obtained.

Then, in case of the thermally assisted magnetic head 400, laser light, emitted from the laser diode 301, is incident on a wave guide, not illustrated, of the magnetic head part 320.

However, in case of the light source-unit 300, the laser diode 301 is joined to the sub-mount 302 though, the laser diode 301 is sometimes arranged in a different position from a desired position of the sub-mount 302.

For example, when the light source-units 300 are manufactured, as illustrated in FIG. 33, the light source-units 300B, 300C, respectively having gap (also called shift-size) gb2, gap gb3, are sometimes manufactured, in addition to the light source-unit 300A, having gap (also called shift-size) gb1. The gap is a space between a surface of the sub-mount 302, on the slide 330 side (also called a mount bottom-surface) and an emission part of the laser diode 301.

If the above-described light source-units 300 are used, differences are made about spaces (emission part gaps, "dd", see FIG. 31) between the emission parts and the waveguides, originated in the differences among the gaps gb1, gb2, gb3, when the light source-units 300A, 300B, 300C are adhered to the sliders 300.

Then, laser light, emitted from the laser diode 301, is incident on the waveguide of the magnetic head part 320. In this case, laser light spread out in the outside in accordance with the enlargement of the emission part gap, the laser light, which spread out in the outside, is incident on the waveguide. Therefore, the laser light, which leaks out in the outside from the entrance of the waveguide, increases in accordance with the enlargement of the emission part gap. Then, the laser light, emitted from the laser diode 301, which is not used for heating the magnetic recording medium, increases. Therefore, usage efficiency of the laser light is lowered in accordance with the enlargement of the emission part gap.

Therefore, it is preferable that the light source-units 300 (light source-unit 300A, in FIG. 33), which has a gap as small as possible, are manufactured, and the light source-units, having larger gaps than the light source-unit 300A, are not manufactured (a preferable gap, for enhancement of usage efficiency of the laser light, is also called "preferred gap"), so that usage efficiency of the laser light is not lowered.

However, it is extremely difficult that the light source-units 300 are manufactured so that the all gaps are standardized into the preferred gap, and the differences in the gaps are not made (in case of FIG. 33, the gaps of all the light source-units become gb1).

Hence the present invention is made to solve the above problem, and it is an object to provide a thermally assisted magnetic head having the structure, which is devised so as to enhance the usage efficiency of the laser light, the head gimbal assembly, the hard disk drive having the thermally assisted magnetic head, and a method of manufacturing the thermally assisted magnetic head.

To solve the above problem, the present invention is a thermally assisted magnetic head including: a slider; and a light source-unit joined to the slider, the slider includes a slider substrate and a magnetic head part formed on the slider substrate, the light source-unit includes a laser diode and a sub-mount which the laser diode is joined; the magnetic head part includes a medium-opposing surface opposing to a magnetic recording medium, a light source-opposing surface arranged rear side of the medium-opposing surface and a waveguide which guides laser light, output from the laser diode, from the light source-opposing surface to the medium-opposing surface, the slider substrate includes a light source-cavity being formed on a light source-placing surface which the light source-unit is placed; the light source-cavity includes an opening concave part being formed larger than a mount bottom surface of the sub-mount, in the light source-placing surface side; the mount bottom surface of the sub-mount is inserted into the opening concave part to be joined to the light source-cavity.

In case of the thermally assisted magnetic head, it is preferable that the light source-cavity includes a flat bottom part, having a flat surface, which is formed inside the opening concave part, the mount bottom surface is joined to the flat bottom part.

Further, in case of the thermally assisted magnetic head, it is preferable that the light source-cavity includes a step-formed structure, which a deep bottom part, being formed deeper than the flat bottom part, is formed in the flat bottom part.

Further, it is preferable that the flat bottom part is formed in a peripheral part of the deep bottom part so as to surround the deep bottom part.

Further, it is preferable that the thermally assisted magnetic head, further including: a solder part, which is accommodated in the deep bottom part, the mount bottom surface is joined to the deep bottom part with the solder part.

In case of the thermally assisted magnetic head, it is preferable that the mount bottom surface is joined to the light source-cavity, thereby a space between the laser diode and the light source-opposing surface is narrowed than the case which the mount bottom surface is joined to the light source-placing surface.

Then, the present invention provides a method of manufacturing the thermally assisted magnetic head, having a slider and a light source-unit being joined to the slider, including: a light source-unit manufacturing step for manufacturing a plurality of light source-unit, using a sub-mount substrate, which a plurality of mount regions, for respectively manufacturing sub-mounts, are formed, and joining laser diodes to the respective mount regions of the sub-mount substrate; a classification step for classifying the light source-units, being manufactured by the light source-unit manufacturing step, into any one of a conformable group or a gap-adjustable group, in accordance with shift-sizes, the shift-sizes are spaces from mount bottom surfaces of the sub-mounts to emission parts of the laser diodes, the conformable group is a group which the shift-sizes are gap reference value or less, the gap-adjustable group is a group which the shift-sizes are larger than the gap reference value; a cavity-slider manufacturing step for manufacturing cavity-sliders having light source-cavities as the slider; and insertion joining step for inserting the mount bottom surfaces of gap-adjustable units, being classified into the gap-adjustable group, of the light source-units, into the light source-cavities of the cavity-sliders to join the gap-adjustable units to the cavity-sliders.

Further, in case of the above-described method of manufacturing the thermally assisted magnetic head, further including: a normal-slider manufacturing step for manufacturing normal-sliders, not having the light source-cavities; and a surface joining step, which conformable units, being classified into the conformable group, of the light source-units, are joined to the surfaces of the normal-slides.

Further, it is preferable that the cavity-slider manufacturing step has a light source-cavity forming step for forming the light source-cavities, the light source-cavity forming step includes a first concave part forming step for forming opening concave parts and flat bottom parts, and a second concave part forming step for forming deep bottom parts, formed deeply than the flat bottom parts.

Further, it is preferable that the light source-cavity forming step is performed so that a plurality of cavity-sliders, including first cavity-sliders which the opening concave parts are formed in a first depth and second cavity-sliders which the opening concave parts are formed in a second depth deeper than the first depth, are formed.

Further, it is preferable that the classification step is performed so that the light source-units, being classified into the gap-adjustable group, are classified into any one of a middle group or a large group, in accordance with the respective shift-sizes, the middle group is a group which the shift-sizes are a classification reference value or less, the large group is a group which the shift-sizes are larger than the classification reference value.

Further, it is preferable that the classification step is performed so that at least three groups, including the middle group and the large group, are prepared as the gap-adjustable groups, the light source-units, being classified into the gap-adjustable groups, are classified into any one of the at least three gap-adjustable groups in accordance with the respective shift-sizes.

It is preferable that the insertion joining step is performed so that middle units, of the light source-units, being classified into the middle group are joined to the first cavity-sliders, and large units, of the light source-units, being classified into the large group are joined to the second cavity-sliders.

In case of the above-described method of manufacturing the thermally assisted magnetic head, it is possible the method of manufacturing the thermally assisted magnetic head, further including: a solder accommodating step for accommodating solder in the deep bottom part, the insertion joining step is performed so that the mount bottom surfaces are joined to the light source-cavities by solder parts made of solder being accommodated by the solder accommodating step.

Further, it is possible that the cavity-slider manufacturing step includes a magnetic head substrate manufacturing step for manufacturing a magnetic head substrate which a plurality of magnetic head parts, having recording head, are formed on a slider substrate for forming the slider, and a bar-like member manufacturing step for forming a plurality of bar-like members respectively having the magnetic head parts by cutting the magnetic head substrate, the light source-cavity forming step is performed so that the light source-cavities are formed on the respective bar-like members.

Then, the present invention provides a head gimbal assembly including a thermally assisted magnetic head, the thermally assisted magnetic head including: a slider; and a light source-unit joined to the slider, the slider includes a slider substrate and a magnetic head part formed on the slider substrate, the light source-unit includes a laser diode and a sub-mount which the laser diode is joined; the magnetic head part includes a medium-opposing surface opposing to a magnetic recording medium, a light source-opposing surface arranged rear side of the medium-opposing surface and a waveguide which guides laser light, output from the laser diode, from the light source-opposing surface to the medium-opposing surface, the slider substrate includes a light source-cavity being formed on a light source-placing surface which the light source-unit is placed; the light source-cavity includes an opening concave part being formed larger than a mount bottom surface of the sub-mount, in the light source-placing surface side; the mount bottom surface of the sub-mount is inserted into the opening concave part to be joined to the light source-cavity.

Then, the present invention provides a hard disk drive including a head gimbal assembly having a thermally assisted magnetic head, and a magnetic recording medium opposing the thermally assisted magnetic head, the thermally assisted magnetic head including: a slider; and a light source-unit joined to the slider, the slider includes a slider substrate and a magnetic head part formed on the slider substrate, the light source-unit includes a laser diode and a sub-mount which the laser diode is joined; the magnetic head part includes a medium-opposing surface opposing to a magnetic recording medium, a light source-opposing surface arranged rear side of the medium-opposing surface and a waveguide which guides laser light, output from the laser diode, from the light source-opposing surface to the medium-opposing surface, the slider substrate includes a light source-cavity being formed on a light source-placing surface which the light source-unit is placed; the light source-cavity includes an opening concave part being formed larger than a mount bottom surface of the sub-mount, in the light source-placing surface side; the mount bottom surface of the sub-mount is inserted into the opening concave part to be joined to the light source-cavity.

The present invention will be more fully understood from the detailed description given hereinbelow and the accompanying drawings which are given by way of illustration only, and thus are not to be considered as limiting the present invention.

BRIEF DESCRIPTION OF THE DRAWINGS

FIG. 32 is a side elevation view schematically showing a manufacturing process of the light source-unit being used for the conventional thermally assisted magnetic head.

DETAILED DESCRIPTION OF THE EMBODIMENTS

In the following, embodiments of the present invention will be described with reference to the drawings. Note that the same components will be referred to with the same numerals or letters, while omitting their overlapping descriptions.

(Structure of the Thermally Assisted Magnetic Head)

Figure 1:
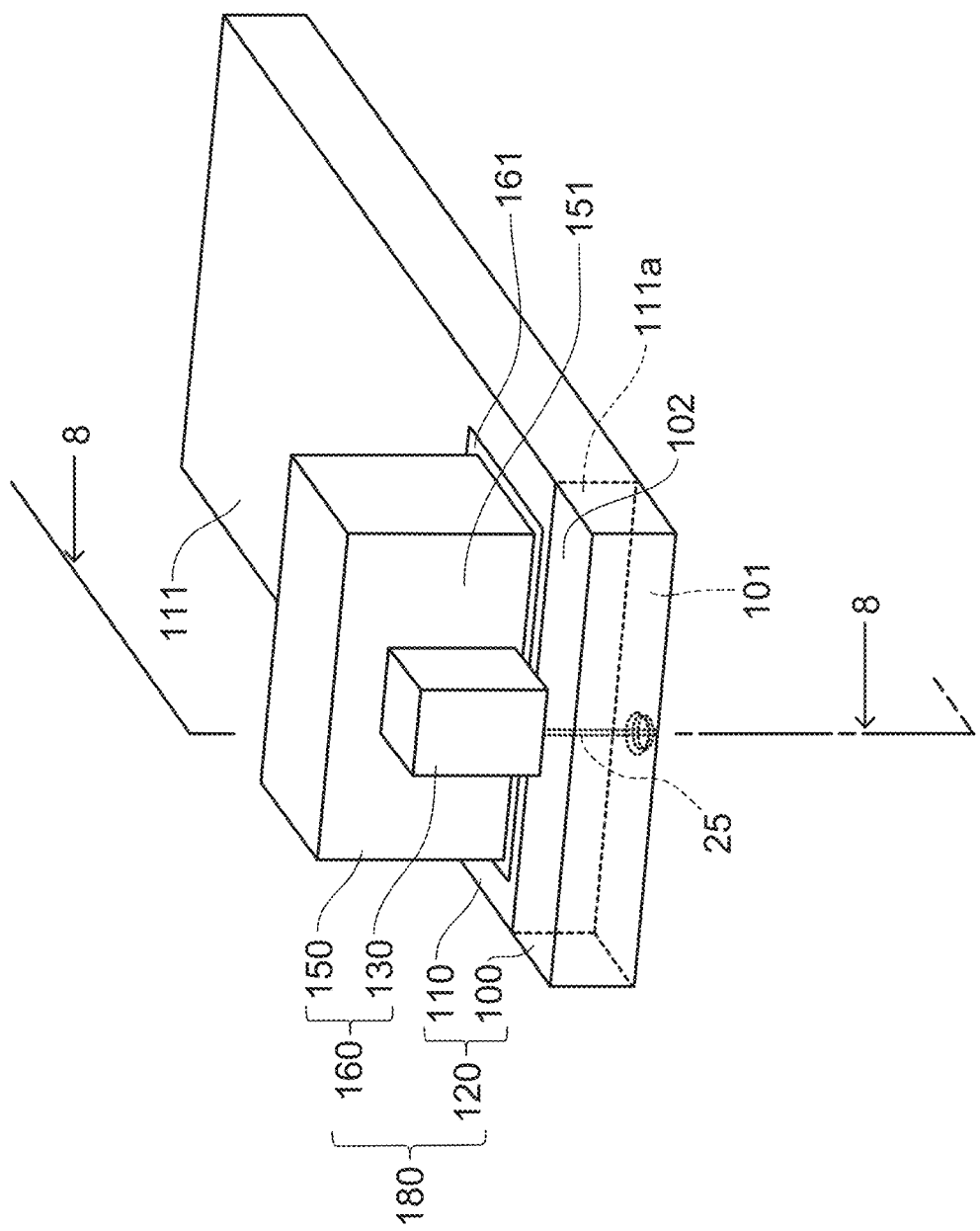
FIG. 1 is a perspective view of the thermally assisted magnetic head according to an embodiment of the present invention.
Figure 2:
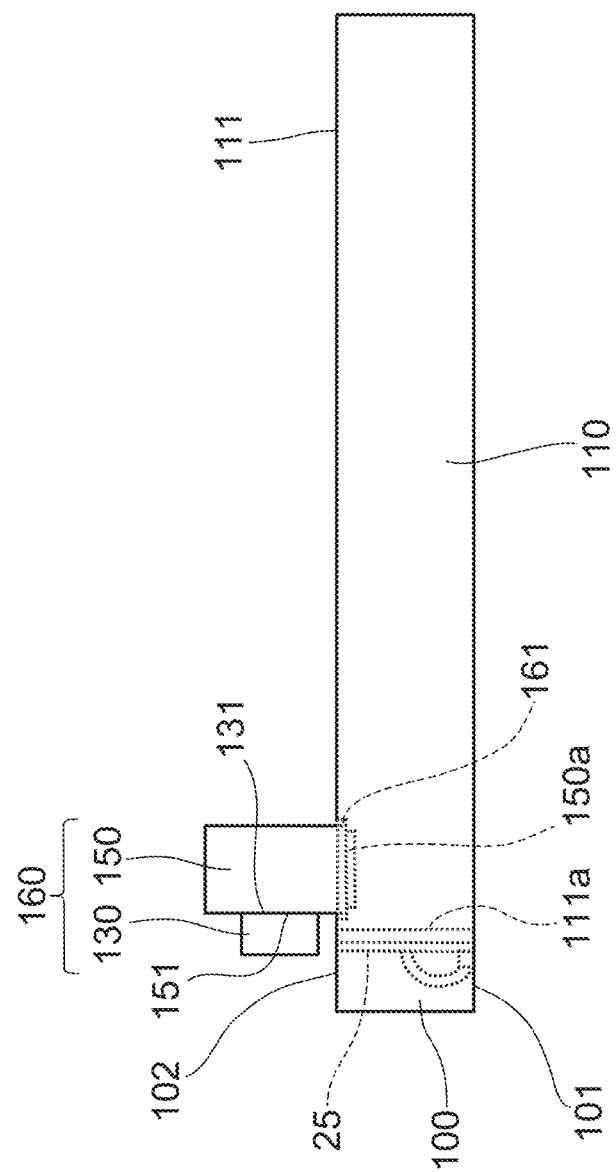
FIG. 2 is a side elevation view of the thermally assisted magnetic head according to the embodiment of the present invention.
Figure 3:
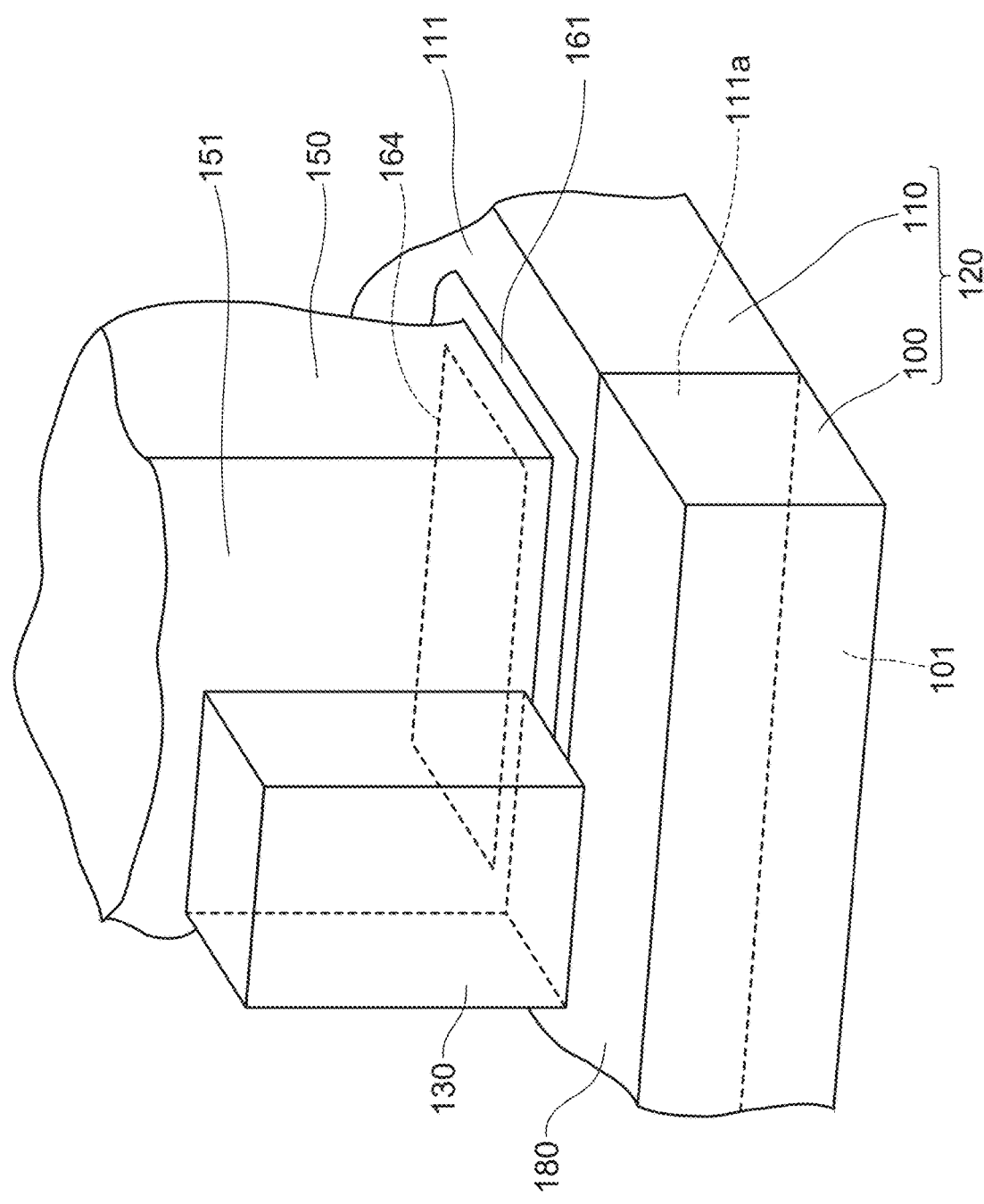
FIG. 3 is a perspective view, with enlargement, of the principal part of the thermally assisted magnetic head.
Figure 4:
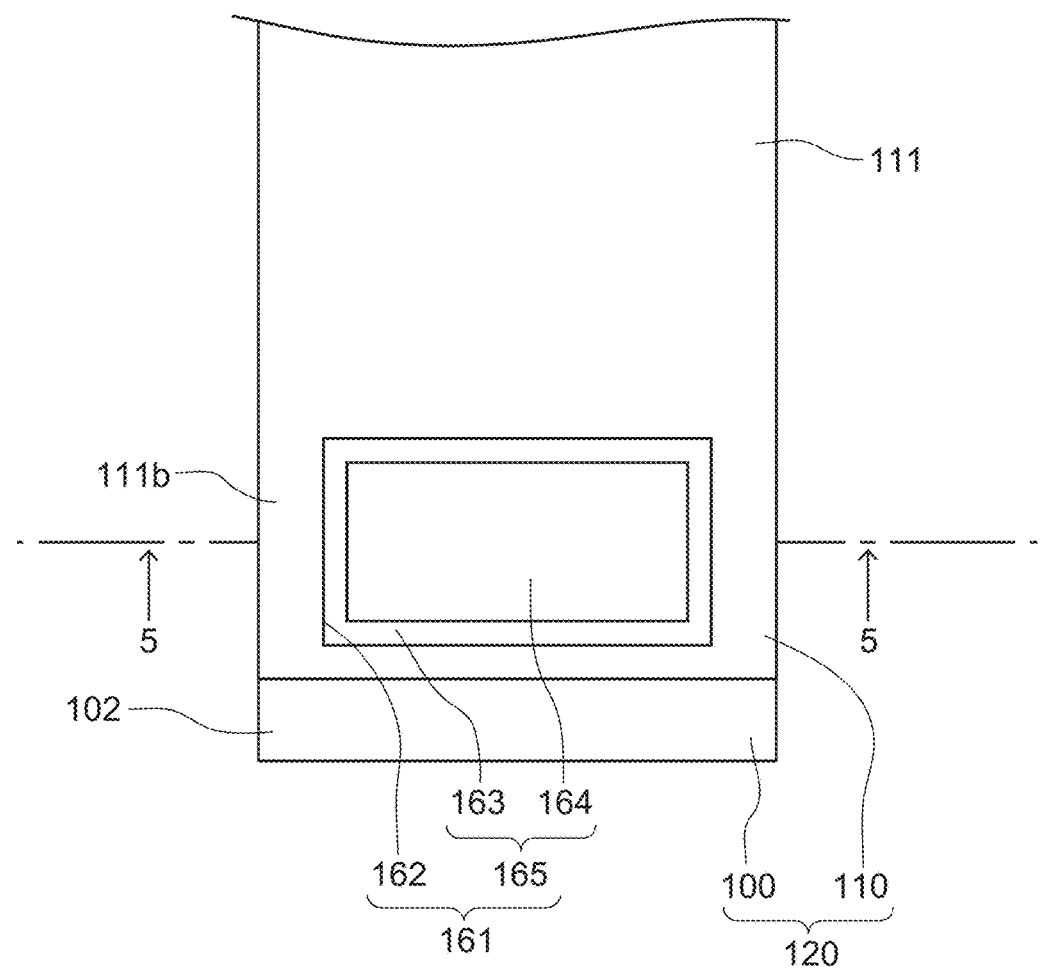
FIG. 4 is a plan view of the principal part of a slider in a light source-placing surface side.
Figure 5:
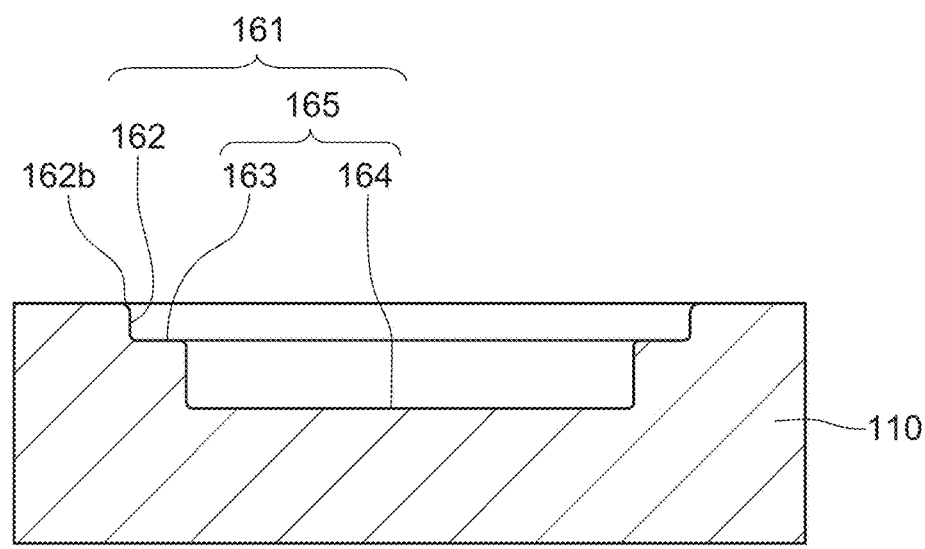
FIG. 5 is a sectional view taken along the line 5-5 in FIG. 4.
Figure 6:
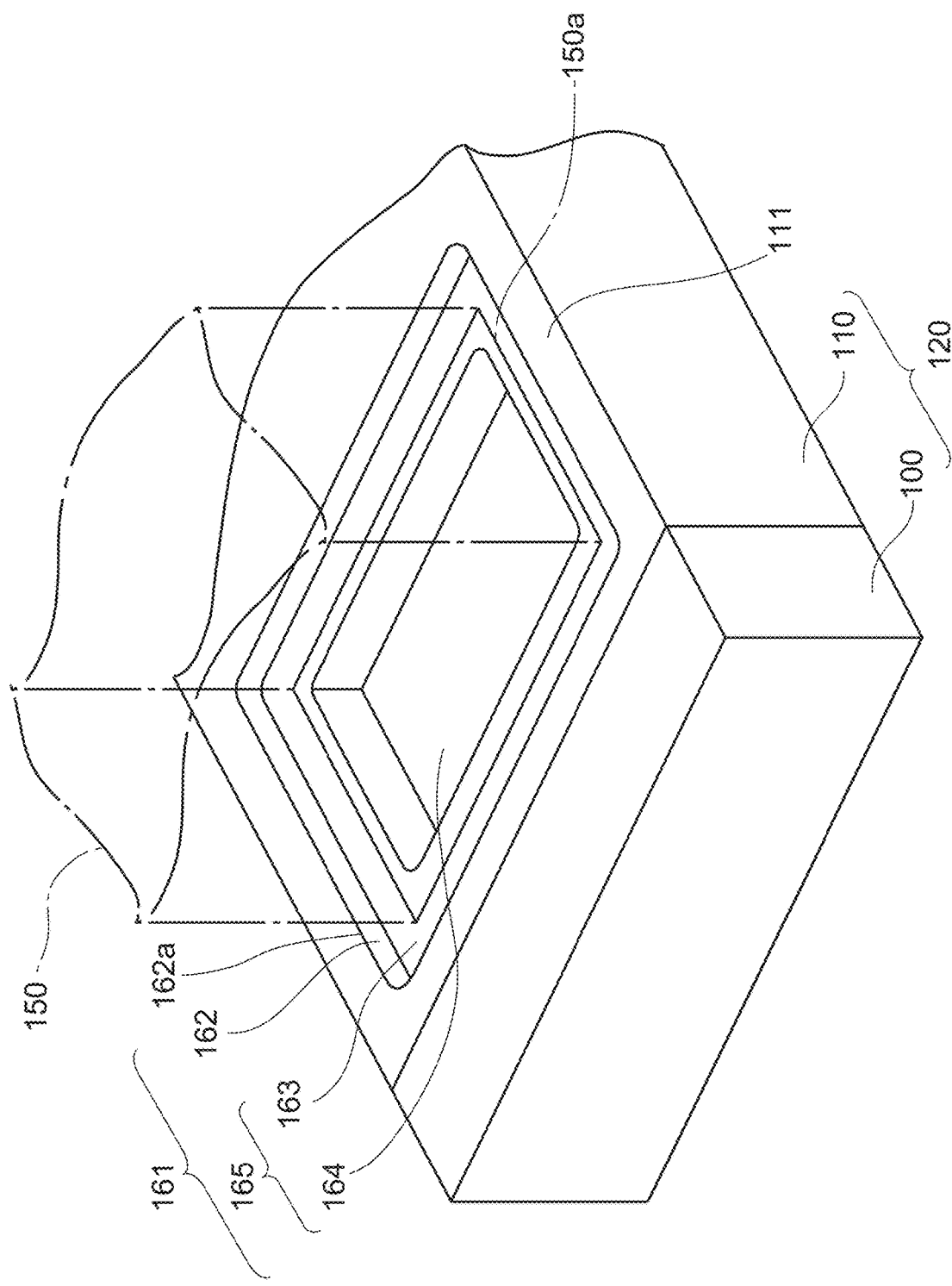
FIG. 6 is a perspective view, with enlargement, of the principal part of the slider.
Figure 7:
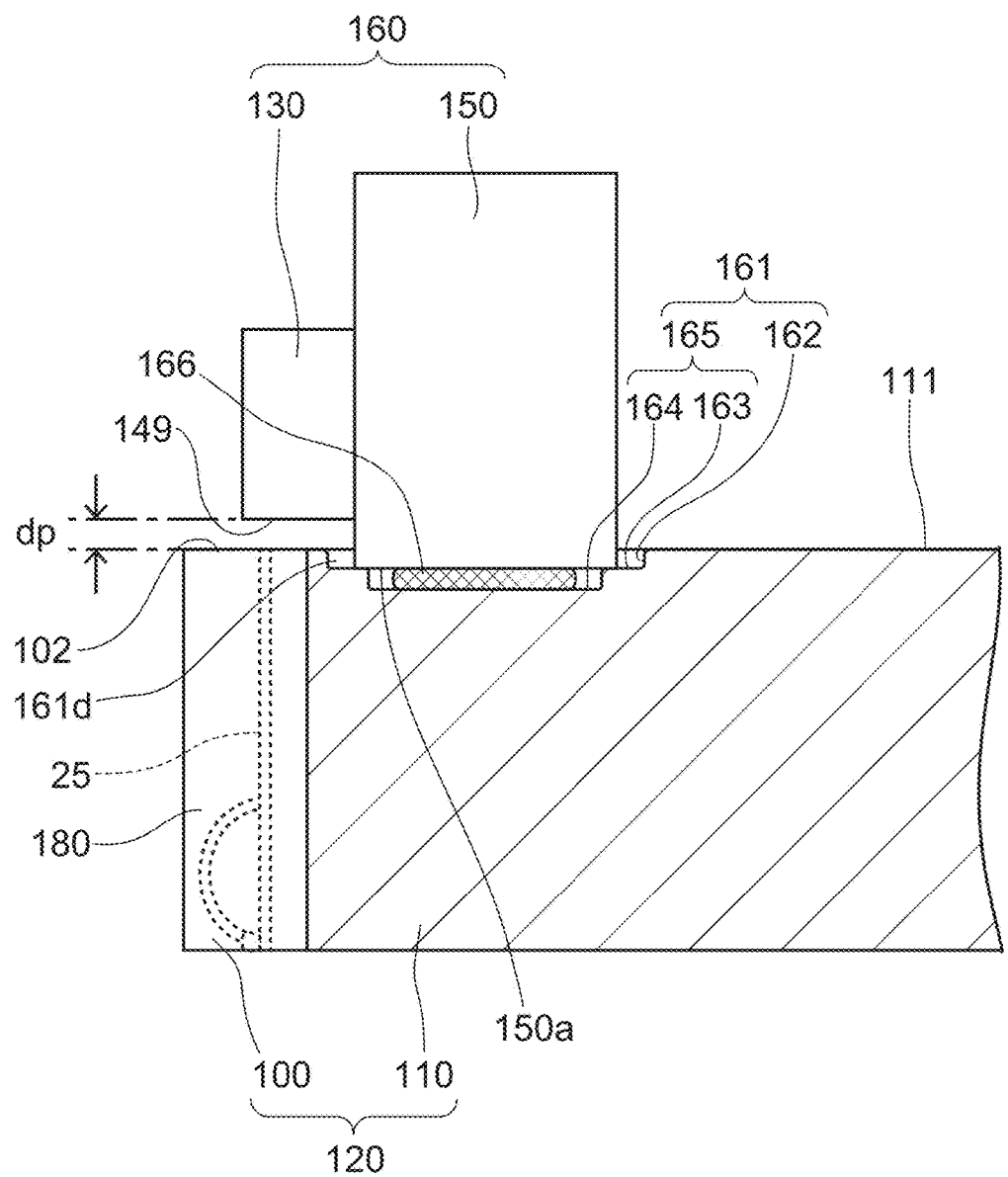
FIG. 7 is a sectional view, partially omitted, of the thermally assisted magnetic head corresponding to the line 8-8 in FIG. 1.
Figure 8:
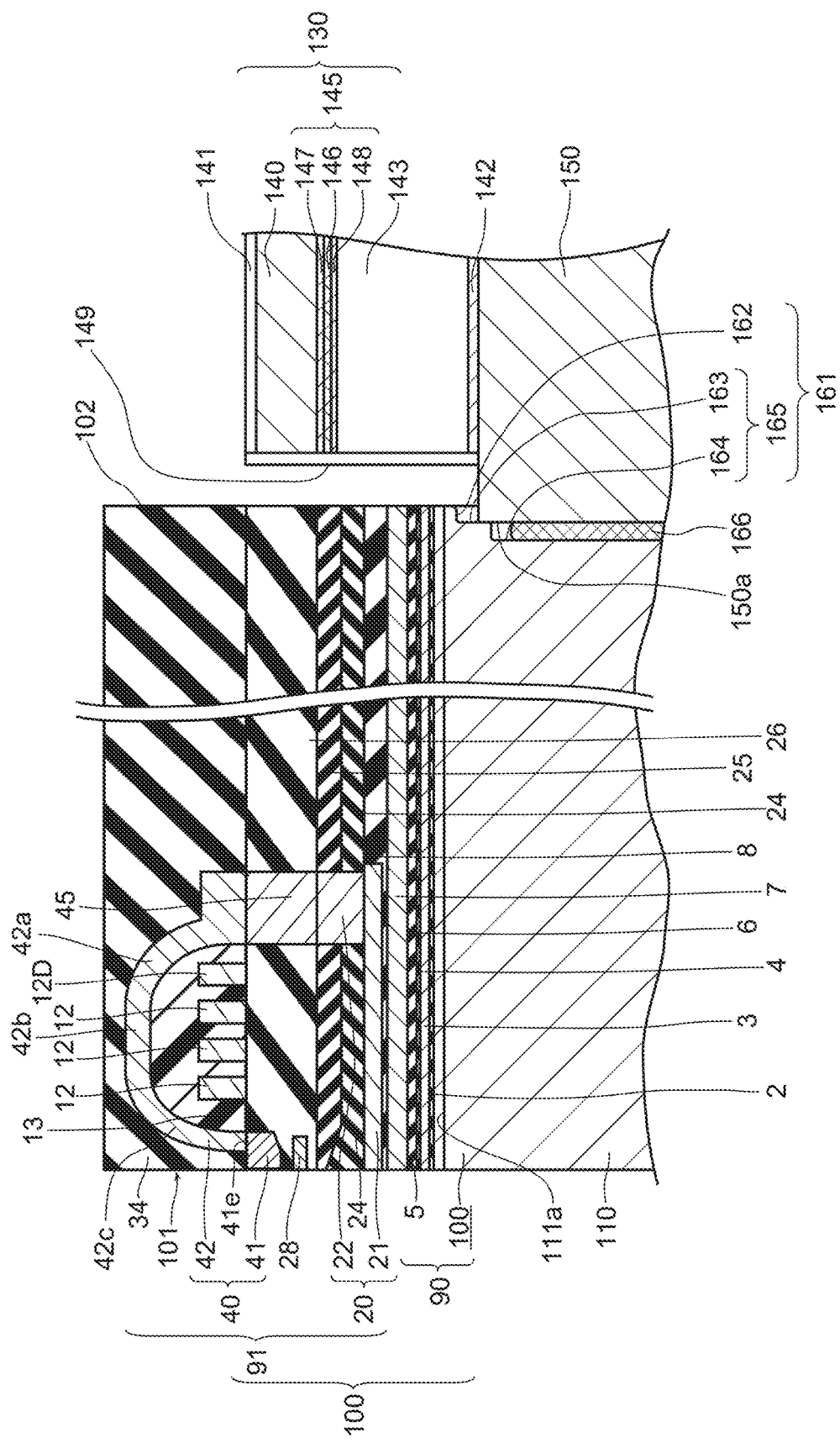
FIG. 8 is a sectional view of the principal part taken along the line 8-8 in FIG. 1.
Figure 9:
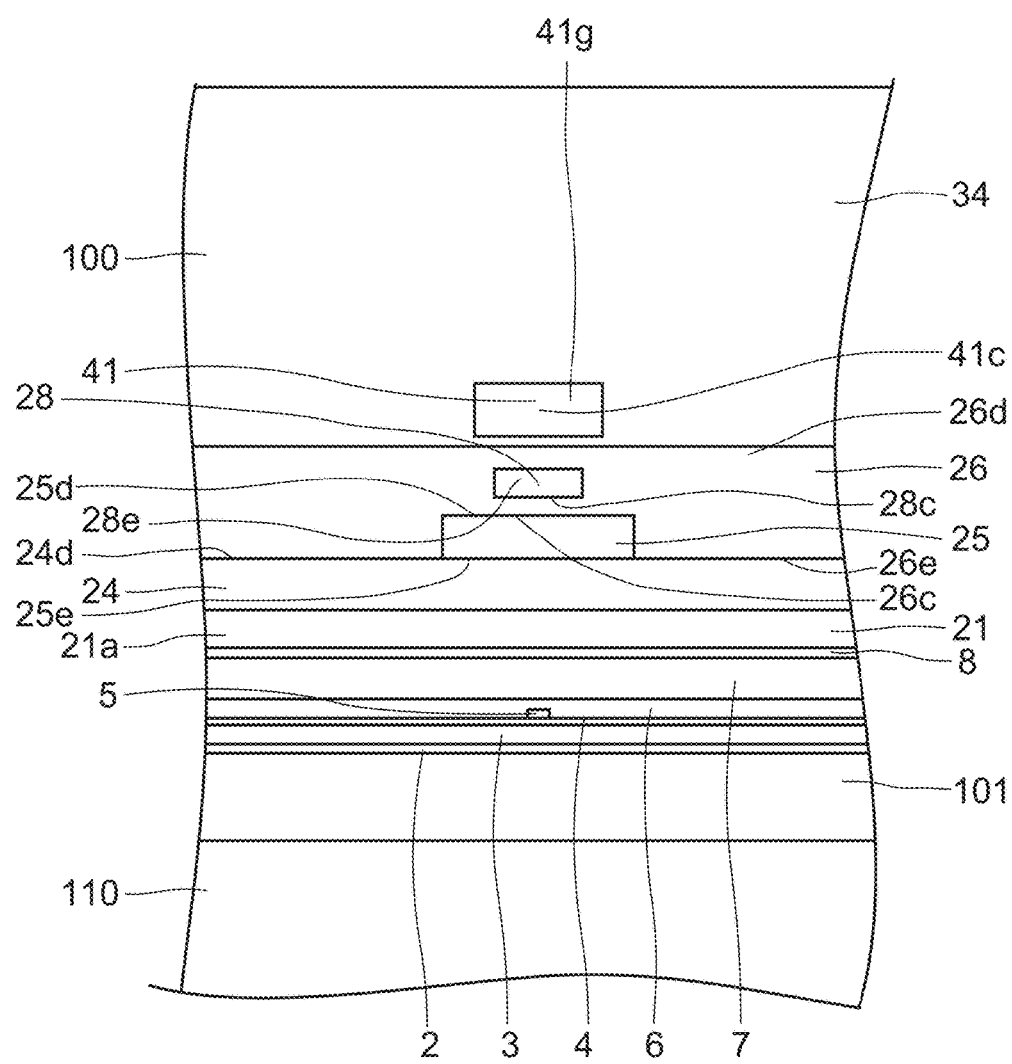
FIG. 9 is a front view, partially omitted, illustrating an air bearing surface of a magnetic head part.

To begin with, structure of the thermally assisted magnetic head according to the embodiment of the present invention will be explained with reference to FIG. 1 to FIG. 9. Here, FIG. 1 is a perspective view of the thermally assisted magnetic head 180 according to the embodiment of the present invention. FIG. 2 is a side elevation view of the thermally assisted magnetic head 180. FIG. 3 is a perspective view, with enlargement, of the principal part of the thermally assisted magnetic head 180. FIG. 4 is a plan view of the principal part of a slider 120 in a light source-placing surface 111 side. FIG. 5 is a sectional view taken along the line 5-5 in FIG. 4. FIG. 6 is a perspective view, with enlargement, of the principal part of the slider 120. FIG. 7 is a sectional view, partially omitted, of the thermally assisted magnetic head 180 corresponding to the line 8-8 in FIG. 1. FIG. 8 is a sectional view of the principal part taken along the line 8-8 in FIG. 1. FIG. 9 is a front view, partially omitted, illustrating a medium opposing surface (Air Bearing Surface, which will hereinafter be referred also to as "ABS") 101 of the magnetic head part 100.

The thermally assisted magnetic head 180 has the slider 120 and a light source-unit 160 joined to the slider 120. The thermally assisted magnetic head 180 has a complex-slider-structure which the light source-unit 160 is joined to the slider 120.

The slider 120 has a slider-substrate 110 and a magnetic head part 100 formed on the slider-substrate 110.

The slider-substrate 110 is made of ceramic material such as aluminum oxide-titanium carbide ($Al_2O_3.TiC$) or the like, and it is formed in a rectangular parallelepiped shape. The slider-substrate 110 has the ABS 101 as the medium opposing surface, opposing to the magnetic recording medium, the light source-placing surface 111, arranged in the rear side of the ABS 101. A part, of the light source-placing surface 111, of the magnetic head part 100 side is a light source-opposing surface 102. The light source-opposing surface 102 opposes to a later-described laser diode 130 of the light source-unit 160.

Further, as illustrated in FIG. 4, the slider-substrate 110 has a light source-cavity 161. The light source-cavity 161 is formed on a cavity area 111b of the light source-placing surface 111. The cavity area 111b is an area, of the light source-placing surface 111, neighborhood of the light source-opposing surface 102. Then, as illustrated in FIG. 7, a later-described sub-mount 150, of the light source-unit 160, is joined to the light source-cavity 161.

(Light Source-Cavity)

The light source-cavity 161, as illustrated in FIG. 4, FIG. 5, FIG. 6, has an opening concave part 162 and a bottom part 165. The opening concave part 162 has an opening part 162b. The opening part 162b has a size which is larger than a later-described mount bottom surface 150a of the sub-mount 150. The opening concave part 162 corresponds to an inner surface part between the opening part 162b and the bottom part 165.

The bottom part 165 is formed inside the opening concave part 162. The bottom part 165 has a flat bottom part 163 and a deep bottom part 164.

The flat bottom part 163 is a part which is connected to the opening concave part 162, and it has a flat surface. The flat bottom part 163 is formed in a peripheral part of the deep bottom part 164 so as to surround the entire deep bottom part 164. The deep bottom part 164 is formed inside of the flat bottom part 163 (center in a plan view of the light source-cavity 161). The deep bottom part 164 is formed deeply than the flat bottom part 163.

Then the light source-cavity 161 has a step-formed structure. The deep bottom part 164 is formed in the flat bottom part 163, thereby a step is formed in the light source-cavity 161, the structure, including the step, is the step-formed structure.

Further, as illustrated in FIG. 7, solder is accommodated in the bottom part 164, the mount bottom surface 150a is joined to the deep bottom part 164 with a solder part 166 made of the solder. Further, the mount bottom surface 150a is in contact with the flat bottom part 163, and it is also joined to the flat bottom part 163.

(Light Source-Unit)

Subsequently, the light source-unit 160 will be explained, with reference to FIG. 2, FIG. 7, FIG. 8. The light source-unit 160 has the laser diode 130 and the sub-mount 150. The laser diode 130 is joined to the sub-mount 150 to constitute the light source-unit 160.

As illustrated in FIG. 8, the laser diode 130 has an n-substrate 140, a stripe n-electrode 141 having band like shape, a light emission layer 145, and a stripe p-electrode 142 having band like shape, and it has a rectangle parallelepiped shape. In addition, the stripe n-electrode 141 is joined to a surface on the outside of the n-substrate 140. Further, the light emission layer 145 is formed on a side of the n-substrate 140 opposite to the stripe n-electrode 141, and the stripe p-electrode 142 is joined on the light emission layer 145, via a ground layer 143.

The light emission layer 145 has an active layer 146, an n-cladding layer 147, and a p-cladding layer 148, and has a structure in which the active layer 146 is sandwiched between the n-cladding layer 147 and the p-cladding layer 148.

Then, the laser diode 130 is joined to the sub-mount 150 so that the active layer 146 opposes to the core layer 25, and an emission part 149 is arranged in a part, of the light emission layer 145, opposing to the core layer 25. The emission part 149 is a part, of the laser diode 130, which emits laser light. The laser diode 130 has an opposing-surface 131. The opposing-surface 131 is a part, of the surface of the laser diode 130, which opposes to the sub-mount 150. The opposing-surface 131 opposes to a later-described joint-surface 151 of the sub-mount 150.

The sub-mount 150 is, for example, made of a silicon (Si), and it is formed in a rectangular parallelepiped shape. The sub-mount 150 has a size larger than the laser diode 130. Further, the sub-mount 150 is able to be formed with semiconductor material such as GaAs, SiC or the like, or a ceramic material such as aluminum oxide-titanium carbide ($Al_2O_3.TiC$) or the like.

As illustrated in FIG. 7, the surface of the sub-mount 150, in the light source-placing surface 111 side, is the mount bottom surface 150a. The mount bottom surface 150a is inserted in the opening concave part 162. Then, the mount bottom surface 150a is joined to the bottom part 165 (the flat bottom part 163 and the deep bottom part 164).

The mount bottom surface 150a is joined to the deep bottom part 164 with the solder part 166. The peripheral part of the mount bottom surface 150a is closely in contact with the flat bottom part 163, and the solder part 166 is adhered to the inside of the peripheral part. Adhesion condition about the mount bottom surface 150a and the flat bottom part 163 is kept by the solder part 166.

Further, the opening concave part 162 is larger than the mount bottom surface 150a. Therefore, as illustrated in FIG. 7, a room 161d is formed between the mount bottom surface 150a and the opening concave part 162.

Then, as described-above, the sub-mount 150 of the light source-unit 160 is joined to the light source-cavity 161 to constitute the thermally assisted magnetic head 180. In case of the thermally assisted magnetic head 180, because the sub-mount 150 is joined to the light source-cavity 161, the sub-mount 150 partially enters inside of the slider-substrate 110 than the light source-placing surface 111. Therefore, a space between the laser diode 130 and the light source-opposing surface 102 is narrowed than the case which the mount bottom surface 150a is joined to the light source-placing surface 111.

(Magnetic Head Part)

Subsequently, the magnetic head part 100 will be explained with mainly reference to FIG. 8 to FIG. 9. The magnetic head part 100 has a reproducing head 90 and a recording head 91. The magnetic head part 100 has a structure which the reproducing head 90 and the recording head 91 are stacked.

The reproducing head 90 has an MR device 5, arranged near the ABS 101, for detecting a magnetic signal. The reproducing head 90 comprises a lower shield layer 3, a lower shield gap film 4, an upper shield gap film 6 and an upper shield layer 7.

Then, an insulating layer 2 is further formed on a thin-film laminated surface 111a of the slider-substrate 110, and the lower shield layer 3 made of a magnetic material is formed on the insulating layer 2. Further, the lower shield gap film 4, as an insulating film, is formed on the lower shield layer 3, and the upper shield gap film 6 shielding the MR device 5 is formed on the lower shield gap film 4. The upper shield layer 7 made of a magnetic material is formed on the upper shield gap film 6, and an insulating layer 8 is formed on the upper shield layer 7.

The MR device 5 is constituted by a magnetosensitive film exhibiting a magnetoresistive effect, such as AMR (anisotropic magnetoresistive), GMR (giant magnetoresistive), and TMR (tunneling magnetoresistive) devices.

The recording head 91 has a thin-film coil 12, a return magnetic layer 20, a core layer 25, a lower dielectric-layer 24, an upper dielectric-layer 26, a near-field light generating layer 28, an overcoat layer 34, a main magnetic pole layer 40, and a linking magnetic pole layer 45, and has a structure in which they are stacked on the thin-film laminated surface 111a.

The thin-film coil 12 has four turn parts. The thin-film coil 12 is wound like a flat spiral about a later-described yoke magnetic pole layer 42 of the main magnetic pole layer 40.

The four turn parts are arranged at respective positions having different distances from the ABS 101. Among them, the turn part 12D is a part arranged at a position most distant from the ABS 101 among the four turn parts of the thin-film coil 12. The four turn parts are insulated from each other by a photoresist 13.

When a current modulated according to data to be recorded on the magnetic recording medium flows through the thin-film coil 12, the current causes the thin-film coil 12 to generate a recording magnetic field.

The return magnetic pole layer 20 has a connecting magnetic pole layer 21, and a rear magnetic pole layer 22. The connecting magnetic pole layer 21 has a magnetic pole end face 21a arranged within the ABS 101 and has a portion that is more distant from the ABS 101 than is the magnetic pole end face 21a being embedded in the insulating layer 8. The connecting magnetic pole layer 21 has a size reaching a position more distant from the ABS 101 than is the turn part 12D. To the connecting magnetic pole layer 21, the rear magnetic pole layer 22 is joined at a position more distant from the ABS 101 than is the turn part 12D.

The rear magnetic pole layer 22 is arranged at a position more distant from the ABS 101 than is the turn part 12D, and it is joined to the connecting magnetic pole layer 21 and the later-described linking magnetic pole layer 45.

The return magnetic pole layer 20 is provided to return a magnetic flux to the main magnetic pole layer 40. When a magnetic flux generated by the recording magnetic field is emitted from a later-described magnetic pole end face 41g of the main magnetic pole layer 40 to the magnetic recording medium, the magnetic flux flows back to the return magnetic pole layer 20 via the magnetic recording medium (a not-depicted soft magnetic layer in detail). This magnetic flux passes through the linking magnetic pole layer 45 and reaches the main magnetic pole layer 40.

The core layer 25 is a waveguide which guides laser light, generated by the later-described laser diode 130 of the light source-unit 160, from the light source-opposing surface 102 to the ABS 101. The core layer 25, as illustrated in FIG. 8, is formed along with a depth direction, passing through between the linking magnetic pole layer 45, from the ABS 101 to the light source-opposing surface 102.

The core layer 25 is formed with dielectric such as tantalum oxide (TaO$_x$) or the like. For example, the core layer 25 is able to be formed with Ta$_2$O$_5$ (for example, the refractive index is about 2.16).

The core layer 25 is formed so as to be accommodated in a later-described concave part 26c of the upper dielectric-layer 26, on an upper surface 24d of the lower dielectric-layer 24. Further, an upper surface 25d and both side surfaces, of the core layer 25, are in contact with the upper dielectric-layer 26, and a lower surface 25e, of the core layer 25, is in contact with the lower dielectric-layer 24.

Then, the upper dielectric-layer 26 and the lower dielectric-layer 24 are arranged in the surrounding of the core layer 25, the cladding layer is constituted by the upper dielectric-layer 26 and the lower dielectric-layer 24.

The upper dielectric-layer 26 is formed in a substantially flat plate shape having a width larger than the width of the magnetic pole end part layer 41. The upper dielectric-layer 26 is formed with dielectric, having the lower refractive index than the core layer 25, for example, such as aluminum oxide (AlO$_x$) or the like. For example, the upper dielectric-layer 26 is able to be formed with alumina (Al$_2$O$_3$, for example, the refractive index is about 1.63). Then, the concave part 26c is formed on the lower surface 26e of the upper dielectric-layer 26, the core layer 25 is accommodated in the concave part 26c.

The lower dielectric-layer 24 is formed so as to be in contact with the lower surface 25e of the core layer 25 and the lower surface 26e of the upper dielectric-layer 26. The lower dielectric-layer 24 is able to be formed with dielectric such as aluminum oxide (AlO$_x$) or the like, similar with the upper dielectric-layer 26.

For example, the lower dielectric-layer 24 is able to be formed with alumina (Al$_2$O$_3$).

The near-field light generating layer 28 has a structure formed in a rectangular shape as a whole, seen from the ABS 101.

The near-field light generating layer 28 is made of metal and formed of, for example, one of Au, Ag, Al, Cu, Pd, Pt, Rh, Ir or an alloy made of a plurality of those elements.

The near-field light generating layer 28 has a bottom part 28c. The bottom part 28c is arranged at the deepest positions of the near-field light generating layer 28. The bottom part 28c extends from the ABS 101 in the depth direction. The end surface of the bottom part 28c on the ABS 101 side is arranged within the ABS 101. This end surface is a generating end part 28e. The generating end part 28e generates near-field light for heating the magnetic recording medium.

The main magnetic pole layer 40 has the magnetic pole end part layer 41 and the yoke magnetic pole layer 42. The magnetic pole end part layer 41 and the yoke magnetic pole layer 42 have a symmetrical structure formed to be bilaterally symmetrical about a front end part 41c.

The front surface including the front end part 41c constitutes the magnetic pole end surface 41g. The magnetic pole end surface 41g is arranged within the ABS 101. The yoke magnetic pole layer 42 is joined to an upper surface 41e of the magnetic pole end part layer 41.

The yoke magnetic pole layer 42 has a rear magnetic pole layer 42a, a middle magnetic pole layer 42b, and a front magnetic pole layer 42c. The yoke magnetic pole layer 42 has a curved structure extending from the ABS 101 in the depth direction and leading to the linking magnetic pole layer 45 straddling the thin-film coil 12.

The rear magnetic pole layer 42a is arranged at a position more distant from the ABS 101 than are the four turn parts of the thin-film coil 12. The rear magnetic pole layer 42a has a lateral width larger than that of the middle magnetic pole layer 42b (the largest lateral width in the yoke magnetic pole layer 42) and is joined to the linking magnetic pole layer 45. The middle magnetic pole layer 42b is arranged above the thin-film coil 12. The middle magnetic pole layer 42b is connected to the rear magnetic pole layer 42a and the front magnetic pole layer 42c. The middle magnetic pole layer 42b has a lateral width gradually getting smaller as it approaches to the ABS 101. The front magnetic pole layer 42c is formed in a downward curved structure getting closer to the magnetic pole end part layer 41 as it approaches to the ABS 101. The front magnetic pole layer 42c is joined to the surface 41e of the magnetic pole end part layer 41.

The linking magnetic pole layer 45 is arranged in a manner to hold the core layer 25 from both right and left sides at a position more distant from the ABS 101 than is the thin-film coil 12. Further, the linking magnetic pole layer 45 is joined to the rear magnetic pole layer 22. The linking magnetic pole layer 45 magnetically links the return magnetic pole layer 20 to the main magnetic pole layer 40, and has a role of returning, to the main magnetic pole layer 40, the magnetic flux flown back to the return magnetic pole layer 20.

(Method of Manufacturing the Thermally Assisted Magnetic Head)

Next, a method of manufacturing the thermally assisted magnetic head, which the thermally assisted magnetic head 180 having the above-described structure is manufactured, will be explained with reference to FIG. 10 to FIG. 21. The method of manufacturing the thermally assisted magnetic head has a light source-unit manufacturing step, a classification step, a cavity-slider manufacturing step, an insertion joining step, a normal-slider manufacturing step and a surface joining step.

(Light Source-Unit Manufacturing Step)

Figure 10:
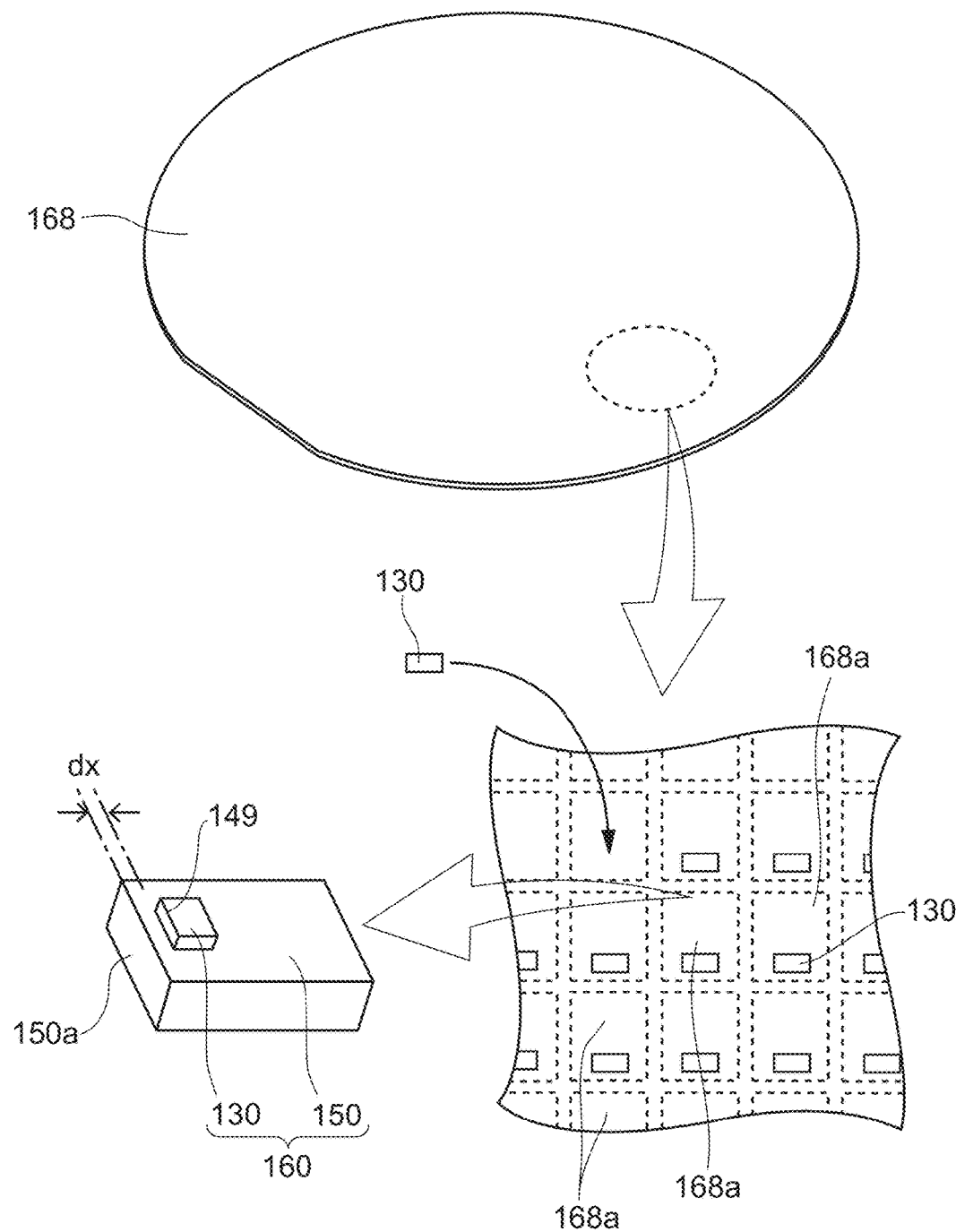
FIG. 10 is a perspective view, showing a principal part of a light source-unit manufacturing step.

In case of the light source-unit manufacturing step, as illustrated in FIG. 10, a plurality of light source-units 160 are formed with a silicon wafer 168.

The silicon wafer 168 is a substrate, which is used for manufacturing the sub-mounts 150 (sub-mount substrate), and it has a plurality of mount regions 168a. The silicon wafer 168 is prepared by a preparing step. The sub-mounts 150 are respectively formed from each of the mount regions 168a.

As illustrated in FIG. 10, the laser diodes 130, having chip forms, are arranged on the respective mount regions 168a of the silicon wafer 168. At this time, the respective laser diodes 130 are joined to the respective mount region 168a with not-illustrated solder.

Subsequently, a not-illustrated dicer is used to cut the silicon wafer 168, thereby the silicon wafer 168 is divided into the respective mount regions 168a. Then, a plurality of light source-units 160, respectively having the laser diode 130 and the sub-mount 150, are manufactured.

(Classification Step)

Figure 19:
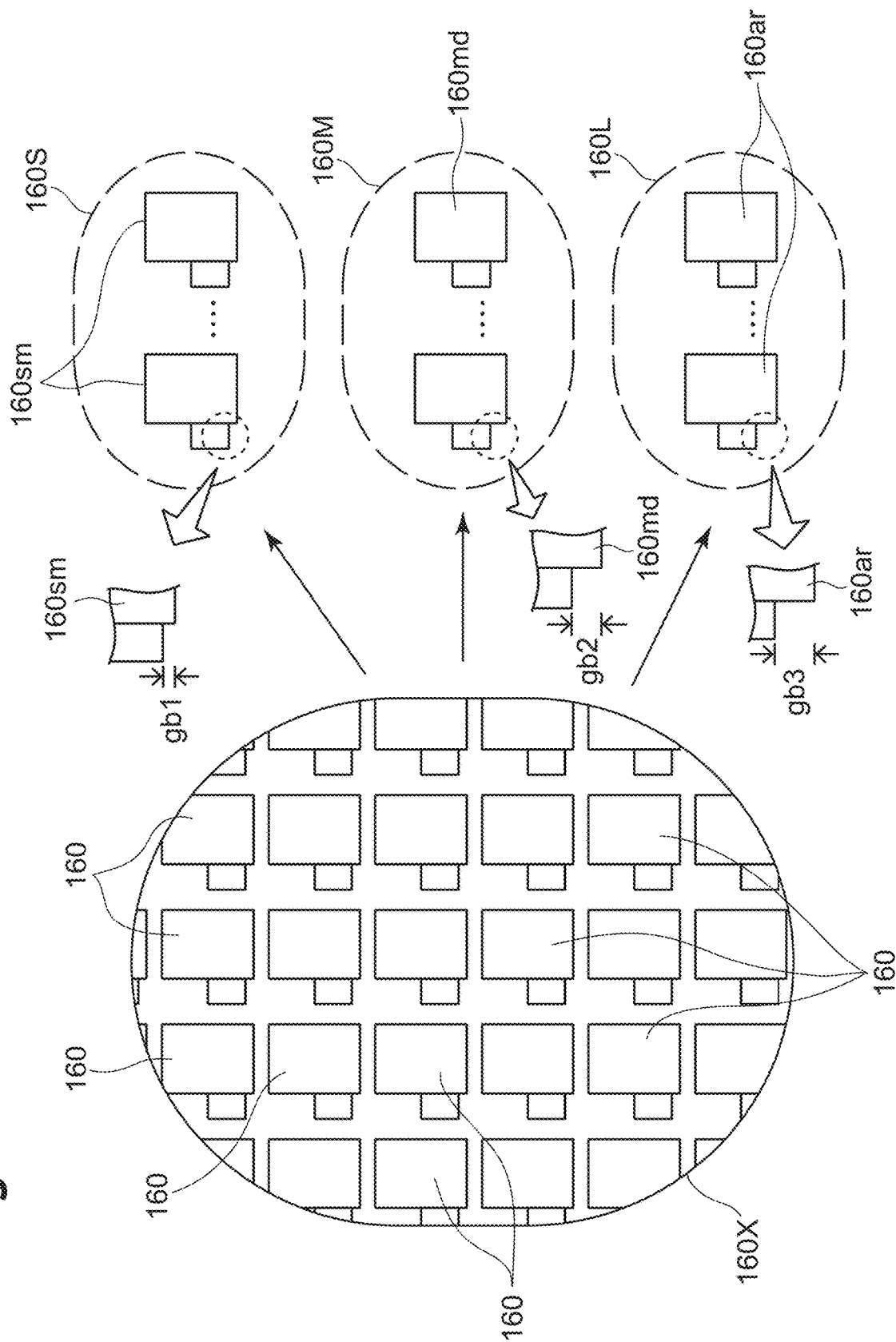
FIG. 19 is a view schematically showing a classification step.

Next, the classification step is performed. In the classification step, a classification procedure concerning a plurality of light source-units 160, being formed in the light source-unit manufacturing step, is performed. As illustrated in FIG. 19, a plurality of light source-units 160, being formed in the light source-unit manufacturing step, are included in a unit group 160X. The classification step is performed concerning the respective light source-units 160, included in the unit group 160X.

In case of the classification step, the respective light source-units 160 are classified into any one of a conformable group or a gap-adjustable group, in accordance with the respective their shift-sizes (later-described in detail). In this embodiment, a group 160S is prepared as the conformable group, groups 160M, 160L are prepared as the gap-adjustable groups.

Here, as illustrated in FIG. 10, the shift-sizes mean spaces (dx, in FIG. 10) from the mount bottom surfaces 150a to the emission parts 149 of the laser diodes 130 in the respective light source-units 160, in the case which the joining positions of the laser diodes 130 are shifted from the mount bottom surfaces 150a.

The light source-units 160, which a later-described emission part gap-adjustment is unnecessary because of the shift-size dx having preferable sizes, are included in the conformable group. In this embodiment, the light source-units 160, which the shift-sizes dx are a predetermined gap reference value of less, are classified into the conformable group 160S. The light source-units 160, which are classified into the conformable group 160S, are conformable units according to the present invention. As illustrated in FIG. 19, for example, the conformable units correspond to light source-units 160sm. The shift-sizes of the light source-units 160sm are "gb1". In case of the thermally assisted magnetic head 180, which the light source-units 160sm are used, preferred gaps are obtained, therefore, the emission part gap-adjustment is not necessary. Therefore, the later-described surface joining step is performed concerning the light source-units 160sm.

The light source-units 160, which the emission part gap-adjustment is performed because of the shift-sizes dx having larger sizes than the gap reference value, are included in the gap-adjustable groups. In this embodiment, the light source-units 160, which the shift-sizes dx are larger than the gap reference value, are classified into the gap-adjustable group.

If the shift-sizes dx are increased in size, gaps between the laser diodes 130 and the light source-opposing surfaces 102 are increased in size, when the thermally assisted magnetic heads 180 are manufactured (when the light source-units 160 are joined to the sliders 120).

Therefore, in this embodiment, the light source-units 160, which the shift-sizes dx are larger than the gap reference value, are classified into the gap-adjustable groups 160M, 160L, so that the light source-units 160 become objects for the emission part gap-adjustment. The light source-units 160, being classified into the gap-adjustable groups 160M, 160L, are gap-adjustable units in this invention.

As illustrated in FIG. 19, for example, the gap-adjustable units correspond to the light source-units 160md, the light source-units 160ar. The shift-sizes of the light source-units 160md are "gb2", the shift-sizes of the light source-units 160ar are "gb3". Note that the magnitudes of the gb1, gb2, gb3 are defined as gb1<gb2<gb3. Concerning the light source-units 160md, the light source-units 160ar, the later-described insertion joining step is performed. Note that the emission part gap means the space between the emission part 149 and the light source-opposing surface 102 ("dp" in FIG. 7).

Then, in this embodiment, a middle group 160M, a large group 160L are prepared as the gap-adjustable groups, so that the emission part gap-adjustment is performed more effectively. When the shift-sizes dx are larger than the gap reference value, the light source-units 160 are classified into any one of the middle group 160M and the large group 160L, in accordance with the respective shift-sizes dx.

The middle group 160M is a group which the light source-units 160, having shift-sizes dx of a middle size, are included. The large group 160L is a group which the light source-units 160, having shift-sizes dx of a large size, are included. The light source-units 160, which the shift-sizes dx are a classification reference value or less, are included in the middle group 160M. The light source-units 160, which the shift-sizes dx are larger than the classification reference value, are included in the large group 160L.

Then, the light source-units 160md, which are classified into the middle group 160M, correspond to middle units. Further, the light source-units 160ar, which are classified into the large group 160L, correspond to large units.

(Cavity-Slider Manufacturing Step)

In the cavity-slider manufacturing step, the sliders 120 having the light source-cavities 161 (correspond to the "cavity-slider" in this invention) are manufactured. The cavity-slider manufacturing step will be explained, with reference to FIG. 11 to FIG. 18.

Figure 11:
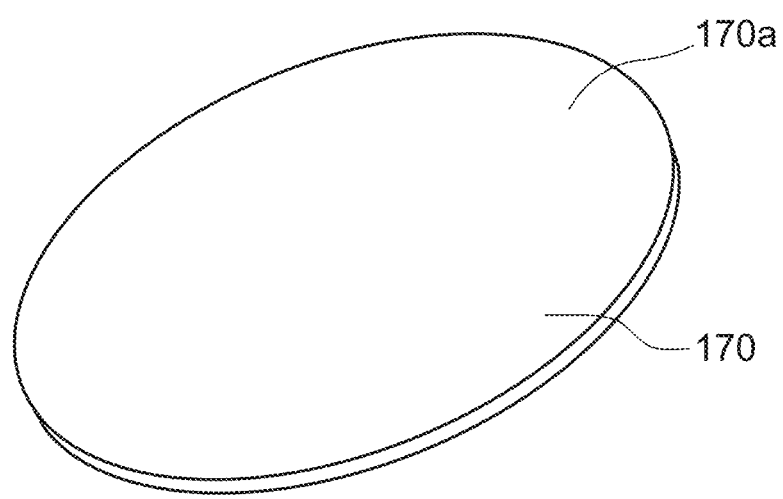
FIG. 11 is a perspective view, showing a ceramic substrate.

The sliders 120 are manufactured with a ceramic substrate 170, as illustrated in FIG. 11. The ceramic substrate 170 is formed with ceramic material such as aluminum oxide-titanium carbide ($Al_2O_3.TiC$) or the like. The ceramic substrate 170 corresponds to a slider substrate in this invention. A thickness of the ceramic substrate 170 corresponds to the length of the slider 120 (length along with the direction from the magnetic head part 100 to the slider-substrate 110).

Then the cavity-slider manufacturing step has a magnetic head substrate manufacturing step, a bar-like member manufacturing step, a light source-cavity forming step.

Figure 12:
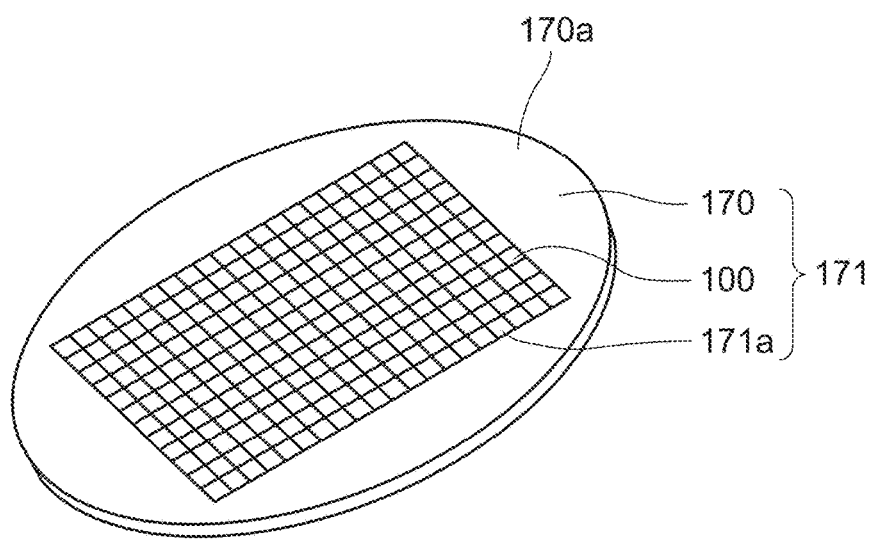
FIG. 12 is a perspective view, showing a magnetic head substrate.

In the magnetic head substrate manufacturing step, as illustrated in FIG. 12, a magnetic head substrate 171 is manufactured. The magnetic head substrate 171 is manufactured with the ceramic substrate 170. The magnetic head substrate 171 has a plurality of slider regions 171a formed on a surface 170a of the ceramic substrate 170. The magnetic head parts 100 are formed in each of the slider regions 171a. The magnetic head parts 100, formed in the respective slider regions 171a, have respectively the reproducing head 90 and the recording head 91.

Then, in the magnetic head substrate manufacturing step, a plurality of slider regions 171a are formed on the surface 170a of the ceramic substrate 170. Further, the magnetic head parts 100 are formed on the respective slider regions 171a, using a thin-film formation technology.

Figure 13:
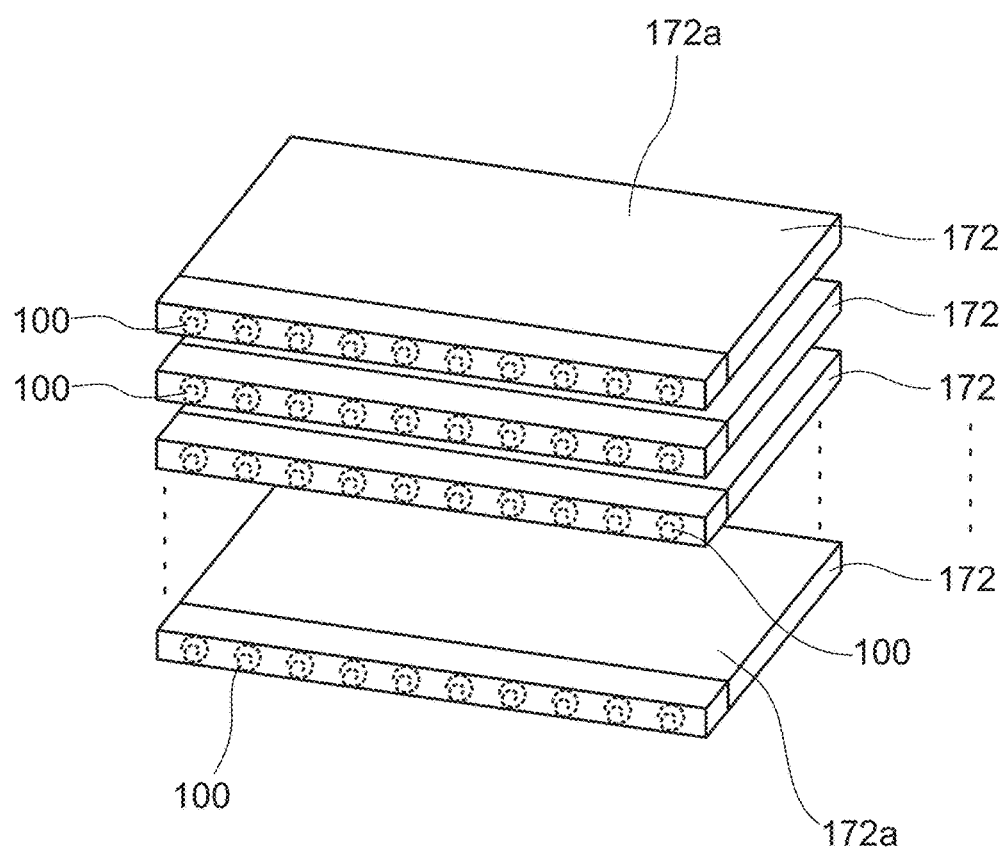
FIG. 13 is a perspective view, showing a plurality of bar-like members.

Next, the bar-like member manufacturing step is performed. In the bar-like member manufacturing step, the magnetic head substrate 171 is cut with not-illustrated dicer along with a perpendicular direction to the surface 170a. Thereby, as illustrated in FIG. 13, a plurality of bar-like members 172 are manufactured. Each of the bar-like members 172 has the magnetic head parts 100. Further, sectional surfaces of the magnetic head substrate 171 are mounting surfaces 172a of the respective bar-like members 172. The mounting surfaces 172a correspond to the light source-placing surfaces 111.

(Light Source-Cavity Forming Step)

Figure 14:
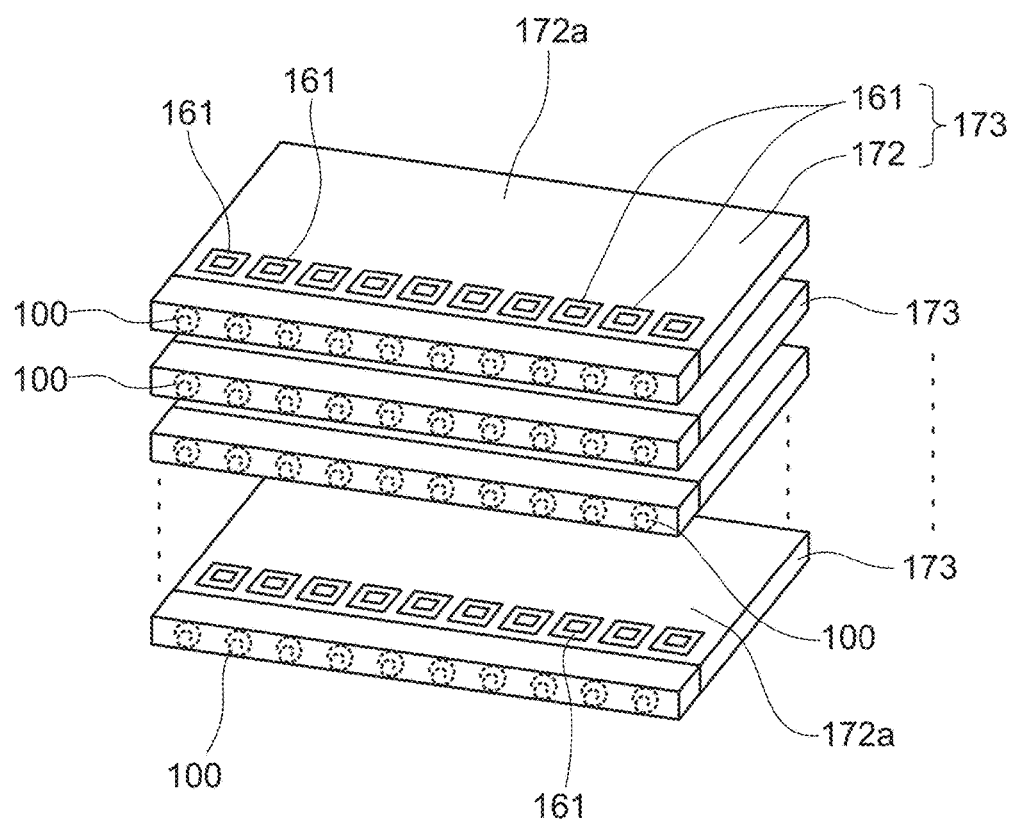
FIG. 14 is a perspective view, showing a plurality of cavity formed bar-like members.
Figure 15:
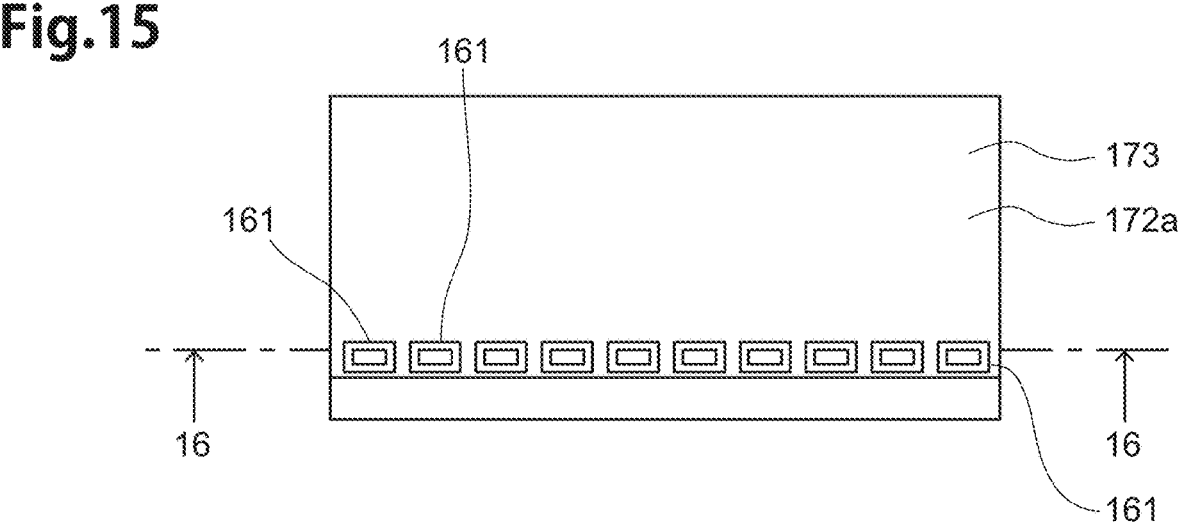
FIG. 15 is a plan view, showing the cavity formed bar-like member.

Next, the light source-cavity forming step is performed. In the light source-cavity forming step, the light source-cavities 161 are formed on the respective mounting surfaces 172a, concerning the respective bar-like members 172, as illustrated in FIG. 14, FIG. 15. Then, cavity formed bar-like members 173 are formed.

Figure 16:
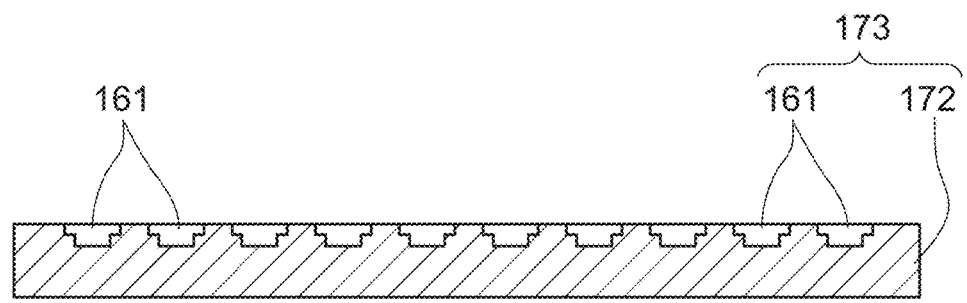
FIG. 16 is a sectional view showing the sectional surface taken along the line 16-16 in FIG. 15.
Figure 17:
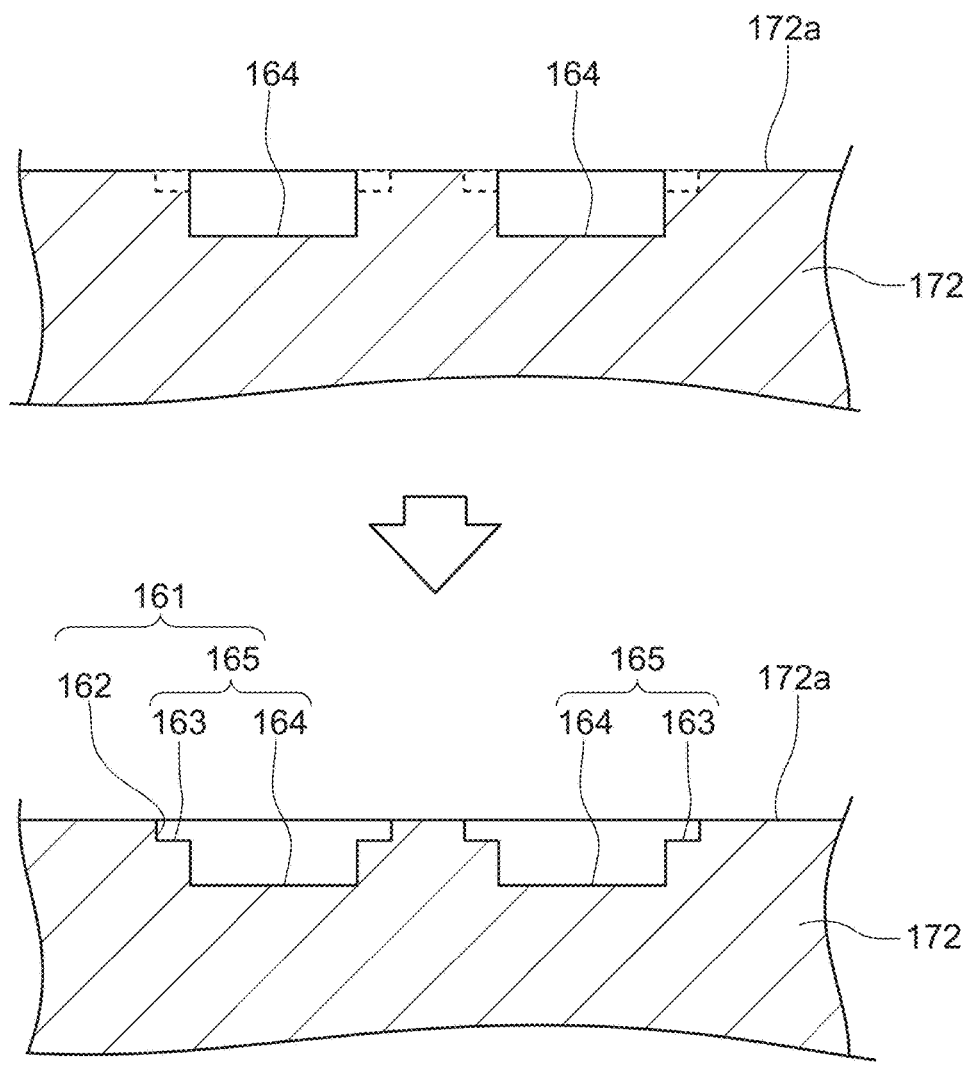
FIG. 17 is a perspective view, showing a light source-cavity forming step, which a second concave part forming step and a first concave part forming step are performed in this order.
Figure 18:
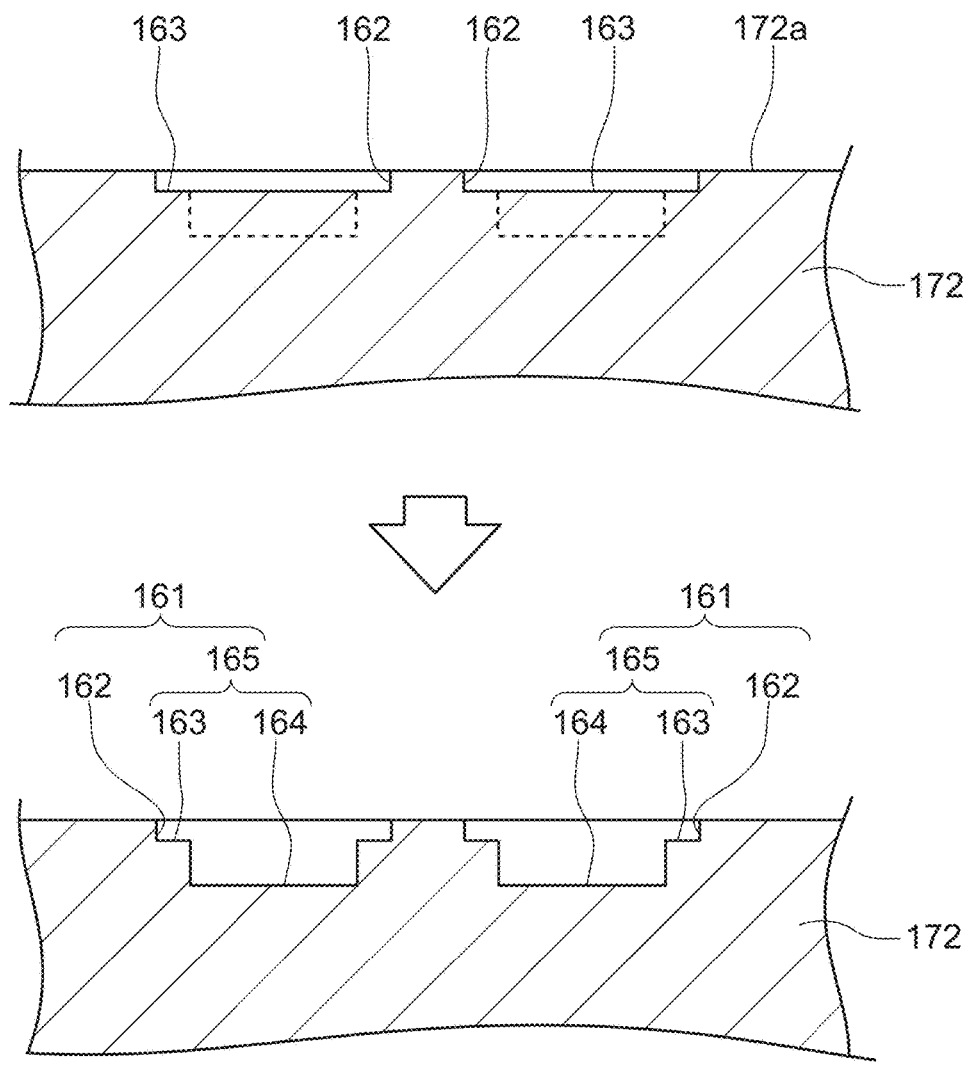
FIG. 18 is a perspective view, showing the light source-cavity forming step, which the first concave part forming step and the second concave part forming step are performed in this order.

Then, the light source-cavity forming step has a first concave part forming step and a second concave part forming step. In the first concave part forming step, as illustrated in FIG. 16 to FIG. 18, a plurality of opening concave parts 162 and flat bottom parts 163 are formed on the mounting surfaces 172a of the respective bar-like members 172. Further, in the second concave part forming step, the deep bottom parts 164 are formed on the mounting surfaces 172a.

The first concave part forming step and the second concave part forming step are performed, thereby the light source-cavities 161, having the opening concave parts 162 and the bottom parts 165, are formed.

For example, as illustrated in FIG. 17, at first, the second concave part forming step is performed, next, the first concave part forming step is performed, thereby, the light source-cavities 161 are formed on the respective mounting surfaces 172a. When the second concave part forming step is performed firstly, the deep bottom parts 164 are formed on the mounting surfaces 172a. Next, when the first concave part forming step is performed, the opening concave parts 162 and the flat bottom parts 163 are formed concerning the respective deep bottom parts 164.

Further, as illustrated in FIG. 18, at first, the first concave part forming step is performed, next, the second concave part forming step is performed, thereby the light source-cavities 161 are also formed on the respective mounting surfaces 172a. In this case, when the first concave part forming step is performed firstly, the flat bottom parts 163 are formed together with the opening concave parts 162. Next, when the second concave part forming step is performed, the deep bottom parts 164 are formed in the respective opening concave parts 162.

After that, the respective cavity formed bar-like members 173 are cut with not-illustrated dicer. Thereby, a plurality of sliders 120 are manufactured. The sliders 120 have light source-cavities 161, therefore, the sliders 120 correspond to the cavity-sliders.

Then, in this embodiment, the above-described the light source-cavity forming step is performed so that first cavity-sliders and second cavity-sliders are formed. The first cavity-sliders have the opening concave parts 162, being formed in a first depth. The second cavity-sliders have the opening concave parts 162, being formed in a second depth which is deeper than the first depth.

In this case, the first cavity-sliders are formed with parts of the cavity formed bar-like members 173, and the second cavity-sliders are formed with another cavity formed bar-like members 173.

Figure 20:
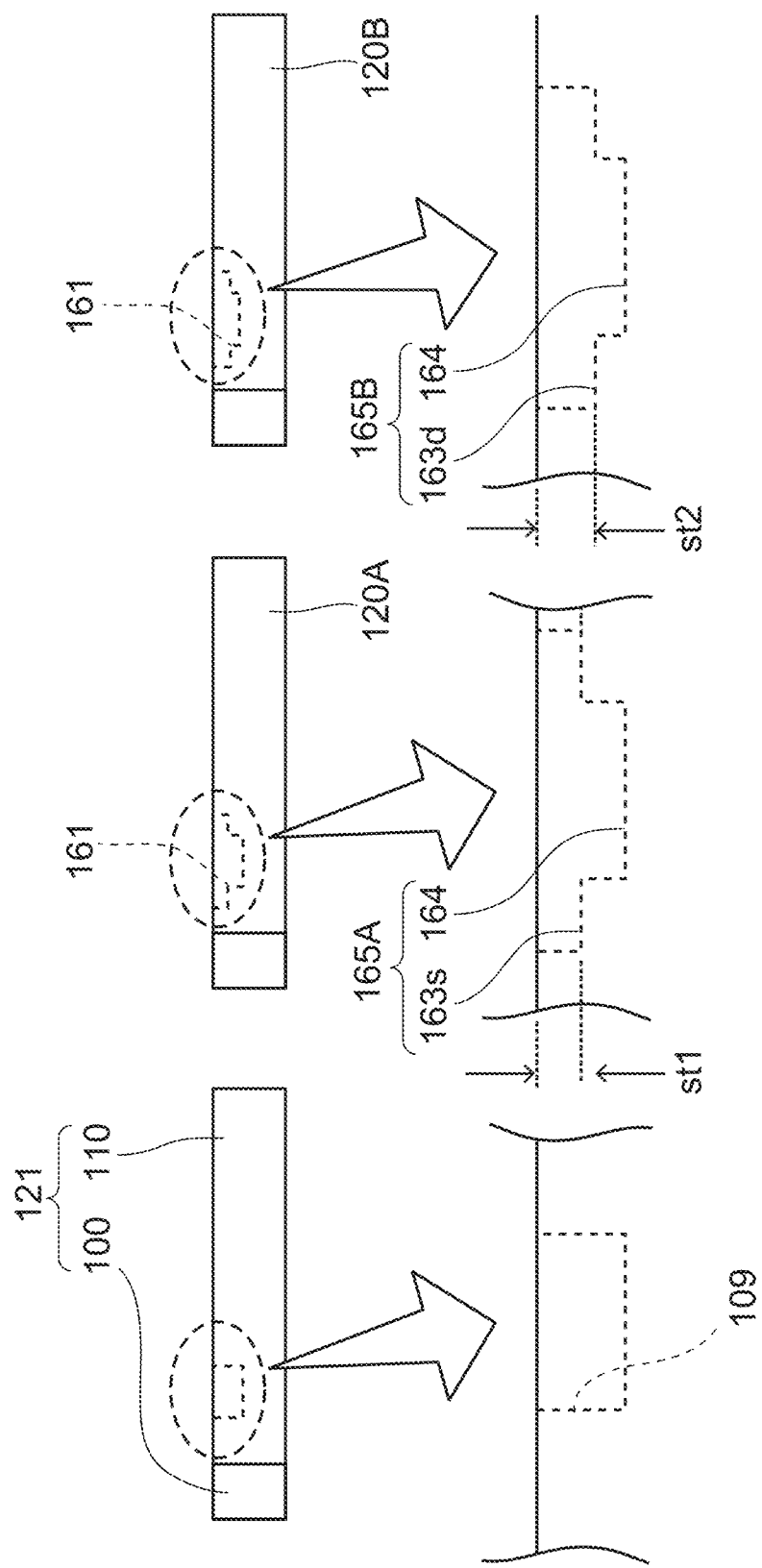
FIG. 20 is a side elevation view showing a normal-slider and a first, second cavity-sliders.

For example, as illustrated in FIG. 20, sliders 120A are formed as the first cavity-sliders, sliders 120B are formed as the second cavity-sliders.

The sliders 120A have bottom parts 165A. The bottom parts 165A have flat bottom parts 163s and the deep bottom parts 164. The depth of the flat bottom parts 163s are st1. Further, the sliders 120B have bottom parts 165B. The bottom parts 165B have flat bottom parts 163d and deep bottom parts 164. The depth of the flat bottom parts 163d are st2. The depth st2 is larger than the depth st1 (st1<st2).

(Insertion Joining Step)

Next, the insertion joining step is performed. In the insertion joining step, the procedure is performed concerning the light source-units 160 (the light source-units 160md, the light source-units 160ar) which are classified into the gap-adjustable group (the middle group 160M or the large group 160L), in the classification step. When the insertion joining step is performed, the emission part gaps are adjusted into magnitudes which are smaller than the respective shift-sizes. Therefore, the emission part gap-adjustment is performed by performing the insertion joining step.

Figure 21:
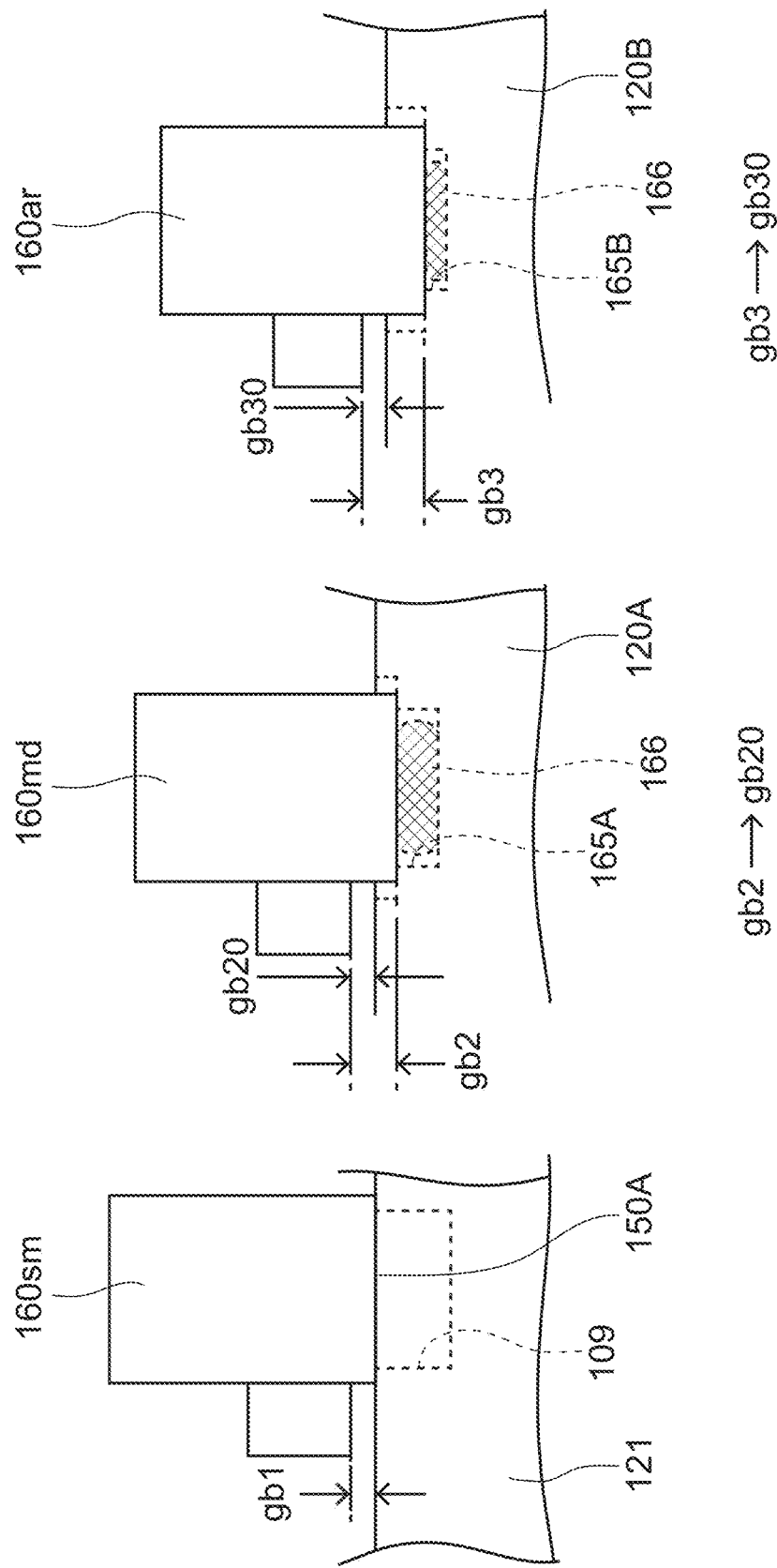
FIG. 21 is a side view, with enlargement, showing parts which a conformable unit, a middle unit, a large unit are respectively joined to the normal-slider, the first, second cavity-sliders.

In this case, as illustrated in FIG. 21, the mount bottom surfaces 150a of the light source-units (middle unit) 160md are inserted into the light source-cavities 161 of the respective slider 120A, thereby the light source-units 160md are joined to the sliders 120A. Then, the emission part gaps become "gb20", which are smaller than the shift-sizes "gb2". Further, the mount bottom surfaces 150a of the light source-units (large unit) 160ar are inserted into the light source-cavities 161 of the respective sliders 120B, thereby the light source-units 160ar are joined to the sliders 120B. Then, the emission part gaps become "gb30", which are smaller than the shift-sizes "gb3".

Further, in this embodiment, a solder accommodating step is performed previously, before the insertion joining step is performed. Thereby, as illustrated in FIG. 21, solder is accommodated in the deep bottom parts 164 of the respective light source-cavities 161, thereby the solder parts 166, made of the accommodated solder, are formed, concerning the respective the sliders 120A, the sliders 120B. Therefore, in the insertion joining step, the sub-mounts 150 (mount bottom surfaces 150a) of the light source-units 160md, 160ar are joined to the light source-cavities 161 with the solder parts 166 which are accommodated in the deep bottom parts 164 of the respective light source-cavities 161. Thereby the light source-units 160md, 160ar are respectively joined to the sliders 120A, the sliders 120B to manufacture the thermally assisted magnetic heads 180.

(Normal-Slider Manufacturing Step)

In the normal-slider manufacturing step, sliders 121 (normal-sliders), not having the light source-cavities 161, are manufactured. The sliders 121 are different in that they have solder cavities 109 instead of the light source-cavities 161, as compared with the sliders 120. The solder cavities 109 have small sizes, than the light source-cavities 161, and the solder cavities 109 have shallow depths than light source-cavities 161. Further, the solder cavities 109 have small sizes than the mount bottom surfaces 150a. Because the sliders 121 do not have the light source-cavities 161, the sliders 121 correspond to normal-sliders of the present invention.

In the normal-slider manufacturing step, the bar-like members 172 are manufactured similar with the cavity-slider manufacturing step. After that, solder cavity forming step is performed instead of the light source-cavity forming step, thereby the solder cavities 109 are formed. Subsequently, the bar-like members 172 are respectively cut with not-illustrated dicer. Thereby a plurality of sliders 121 are manufactured.

(Surface Joining Step)

In the surface joining step, the conformable units are joined to the surface of the sliders 121. The conformable units are the light source-units 160sm, being classified into the conformable group 160S. Solders (not illustrated) are accommodated in the solder cavities 109. In the surface joining step, as illustrated in FIG. 21, the light source-units 160sm are joined to the surface of the sliders 121 so that the sub-mounts 150 covers the solder cavities 109 (so that the mount bottom surfaces 150a do not enter the solder cavities 109).

Because the shift-sizes of the light source-units 160sm are preferred sizes, the light source-units 160sm are classified into the conformable group 160S. Concerning the light source-units 160sm, the emission part gap-adjustment is unnecessary. Therefore, the surface joining step is performed. Concerning the thermally assisted magnetic heads 180, being manufactured with the light source-units 160sm, the emission part gaps are equal to the shift-size "gb1".

As described-above, the thermally assisted magnetic heads 180 are manufactured. In this embodiment, the manufactured thermally assisted magnetic heads include the following three types of thermally assisted magnetic heads. Namely, the first type is the thermally assisted magnetic heads having the light source-units 160sm and the slider 121. The second type is the thermally assisted magnetic heads 180 having the light source-units 160md and the slider 120A, and the third type is the thermally assisted magnetic heads 180 having the light source-units 160ar and the slider 120B.

In the thermally assisted magnetic heads 180 having the light source-units 160md and the slider 120A, because the emission part gaps are adjusted, the emission part gaps become "gb20", smaller than the shift-size "gb2". Further, in the thermally assisted magnetic heads 180 having the light source-units 160ar and the slider 120B, because the emission part gaps are adjusted, the emission part gaps become "gb30", smaller than the shift-size "gb3".

(Operation and Effect of the Thermally Assisted Magnetic Head)

As described-above, in the thermally assisted magnetic heads 180, the sliders 120 have the light source-cavities 161, the light source-units 160 are joined to the light source-cavities 161. The light source-cavities 161 have the opening concave parts 162, being formed larger than the mount bottom surfaces 150a. Therefore, the mount bottom surfaces 150a of the sub-mounts 150 enter inside the opening concave part 162, and the mount bottom surfaces 150a are joined to the bottom parts 165. Therefore, the space between the laser diodes 130 and the light source-opposing surfaces 102 are narrowed than the case which the mount bottom surfaces 150a are joined to the light source-placing surfaces 111.

By the way, in the thermally assisted magnetic heads 180, laser light, emitted from the laser diode 130, enter the waveguide 25 of the recording head 91.

However, if the spaces, between the laser diodes 130 and the light source-opposing surfaces 102, are enlarged, laser light, emitted from the laser diode 130, spread outside. After that, laser light enter the waveguide 25. Therefore, in laser light emitted from the laser diodes 130, laser light, which do not enter the waveguide 25, increase, thereby usage efficiency of the laser light is lowered. Then, laser light, needed for heating, increase, and current also increases.

Therefore, it is preferable that the thermally assisted magnetic heads 180 are manufactured with the light source-units 160, which the shift-sizes (dx in FIG. 10) are as small as possible, so that the laser diodes 130 approach the light source-opposing surfaces 102 as much as possible.

However, it is extremely difficult that the shift-sizes are standardized into the desired size, concerning the whole of the manufactured light source-units 160.

Then in this embodiment, the thermally assisted magnetic heads 180 are manufactured with the sliders 120 having the light source-cavities 161. Because the sliders 120 have the light source-cavities 161, the sub-mounts 150 of the light source-units 160 are inserted into the light source-cavities 161. Then even if the shift-sizes of the light source-units 160 are large sizes, as the above-described light source-units 160md, the light source-units 160ar, the emission part gaps become small sizes than the shift-sizes, in the manufactured thermally assisted magnetic heads 180. Namely, the space, between the laser diodes 130 and the light source-opposing surfaces 102, are narrowed than the case which the mount bottom surfaces 150a are joined to the light source-placing surfaces 111. Then the laser diodes 130 approach the light source-opposing surfaces 102. Therefore, even if the light source-units 160, which the shift-sizes are larger than the gap reference value, are used, laser light, needed for heating, do not increase. Increase of current, needed for heating, is suppressed. Therefore, usage efficiency of the laser light is able to be enhanced.

Further, because the light source-cavities 161 have the flat bottom parts 163, the mount bottom surfaces 150a are joined to the flat bottom parts 163. Because the surfaces of the flat bottom parts 163 are formed flatly, the light source-units 160 are joined to the flat bottom parts 163 stably.

Furthermore, because the light source-cavities 161 have the deep bottom parts 164, solder is accommodated in the deep bottom parts 164, thereby the solder parts 166 are able to be formed It is possible that the mount bottom surfaces 150a are joined to the light source-cavities 161 with the solder parts 166.

Because the flat bottom parts 163 are formed in the peripheral parts of the deep bottom parts 164 so as to surround the deep bottom parts 164, the peripheral parts of the mount bottom surfaces 150a are joined entirely to the flat bottom parts 163. Therefore, joining condition of the light source-units 160 is stable.

Modified Example 1

Next, a slider 129, according to the modified example, will be explained with reference to FIG. 22, FIG. 23. The slider 129 is different in that it has a light source-cavity 167 instead of the light source-cavity 161, as compared with the slider 120.

Figure 22:
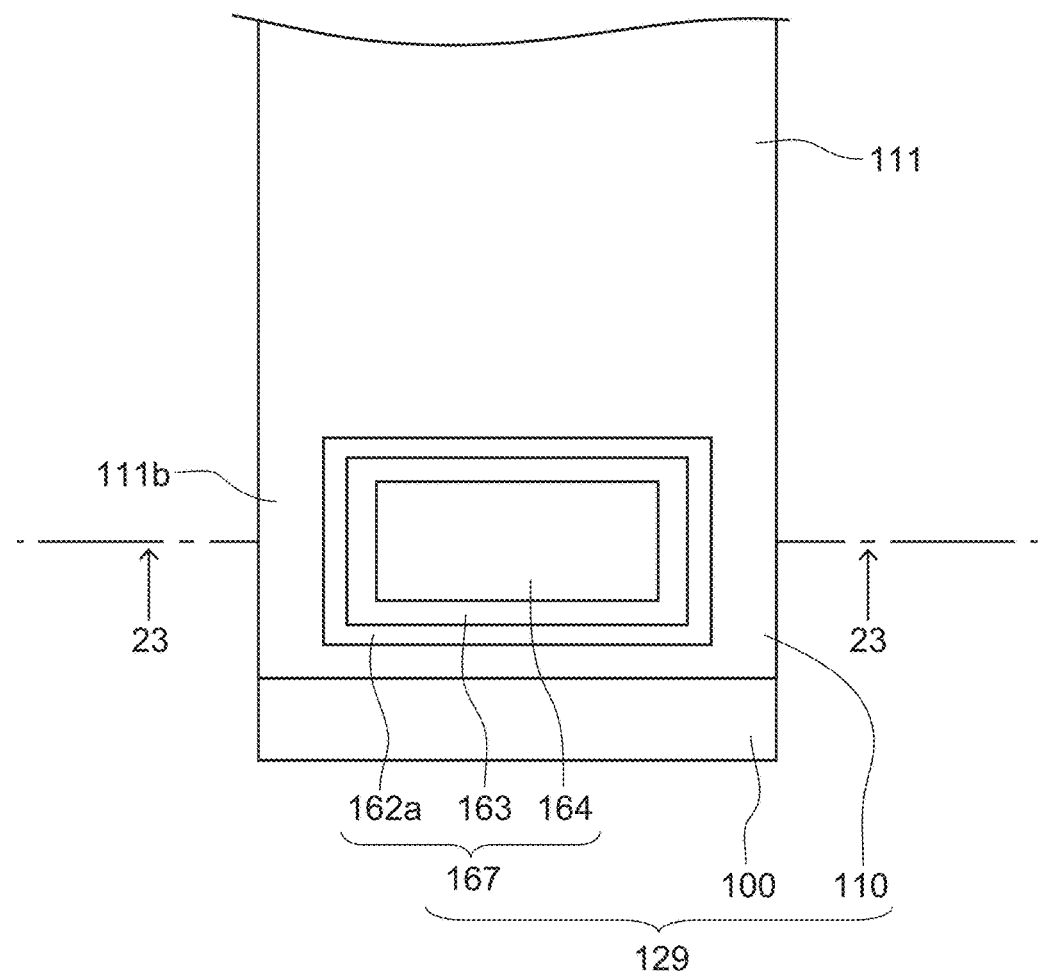
FIG. 22 is a plan view showing the principal part, in the light source-placing surface side, of the slider according to a modified example.
Figure 23:
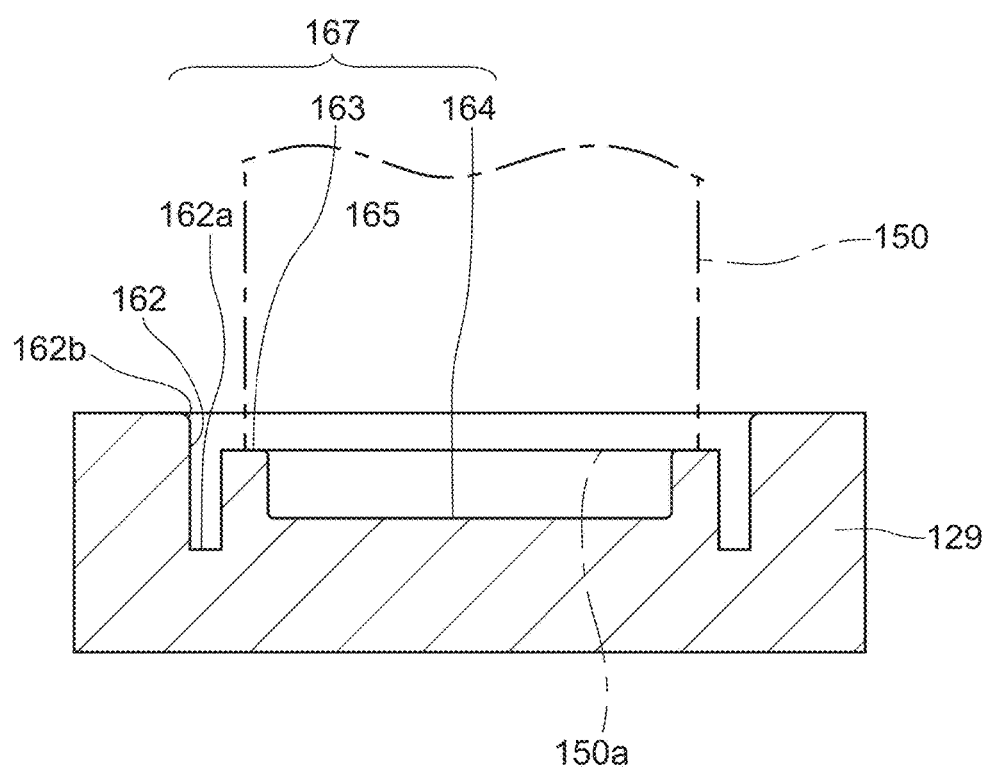
FIG. 23 is a sectional view taken along the line 23-23 in FIG. 22.

As illustrated in FIG. 22, FIG. 23, the light source-cavity 167 is different in that it has a peripheral concave part 162a, as compared with the light source-cavity 161. The peripheral concave part 162a is formed most outside of the flat bottom part 163. The peripheral concave part 162a has a depth, which is deeper than the deep bottom part 164.

As illustrated in FIG. 5, in the light source-cavity 161, only the flat bottom part 163, being formed shallowly than the deep bottom part 164, are arranged outside of the deep bottom part 164. To the contrary, in the light source-cavity 167, not only the flat bottom part 163 but also the deep part (peripheral concave part 162a), deeper than the deep bottom parts 164, are also arranged outside of the deep bottom part 164.

Then, when the sub-mount 150 is inserted into the light source-cavity 167, the mount bottom surface 150a is joined to the flat bottom part 163.

Even if the slider 129 is used, the emission part gap is adjusted similar with the case which the slider 120 is used. Therefore, the thermally assisted magnetic head (not illustrated), having the slider 129, has the same operation and effect, similar with the thermally assisted magnetic head 180.

Modified Example 2

Figure 25:
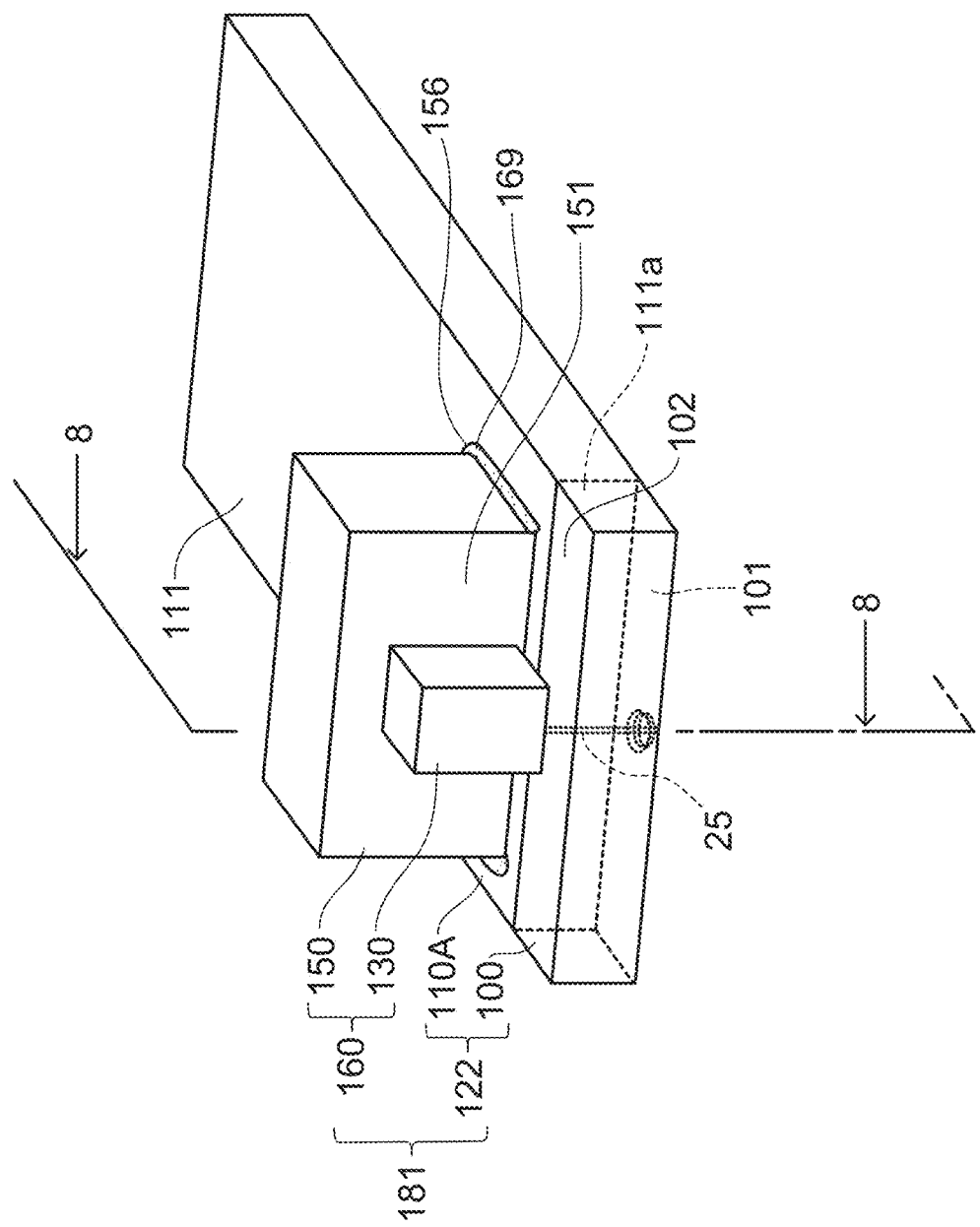
FIG. 25 is a perspective view of the thermally assisted magnetic head according to the modified example.
Figure 26:
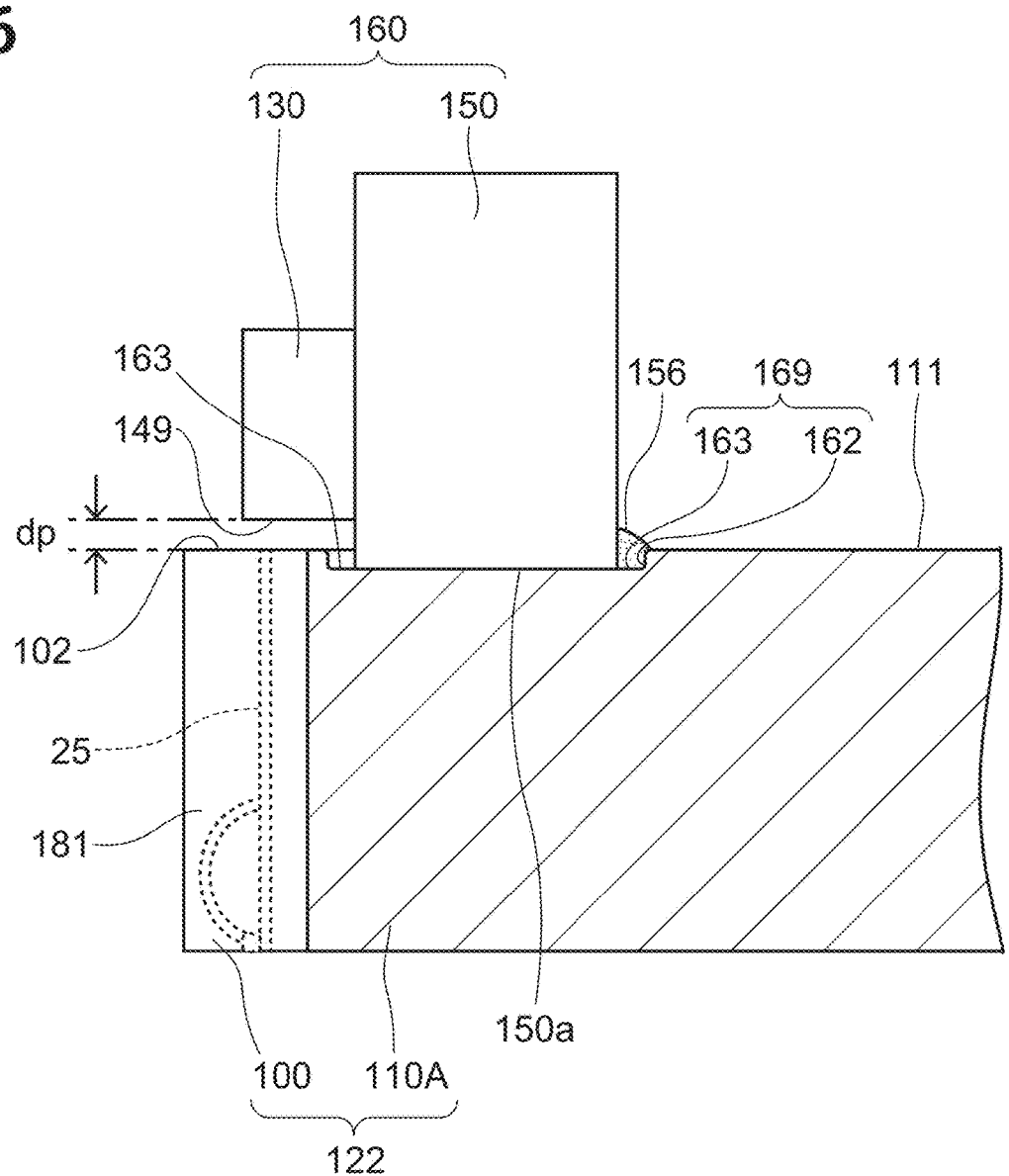
FIG. 26 is a sectional view, corresponding to FIG. 7, of the thermally assisted magnetic head according to the modified example.

Next, a thermally assisted magnetic head 181, according to the modified example, will be explained with reference to FIG. 25, FIG. 26. The thermally assisted magnetic head 181 is different in that it has a slider 122 instead of the slider 120, as compared with the thermally assisted magnetic head 180.

The slider 122 is different in that it has a slider-substrate 110A instead of the slider-substrate 110, as compared with the slider 120. The slider-substrate 110A is different in that it has a light source-cavity 169 instead of the light source-cavity 161, and it has a solder part 156 instead of the solder part 166, as compared with the slider-substrate 110.

The light source-cavity 169 has the opening concave part 162 and the flat bottom part 163 though, similar with the light source-cavity 161, the light source-cavity 169 does not have the deep bottom part 164. The bottom part of the light source-cavity 169 is formed flat. Therefore, in the thermally assisted magnetic head 181, the mount bottom surface 150a of the sub-mount 150 is entirely adhered to the flat bottom part 163. Further, the solder part 156 is formed in the peripheral part of the opening concave part 162 (except for the part which the laser diode 130 is arranged), thereby the light source-unit 160 is joined to the light source-cavity 169.

Because the emission part gap is adjusted concerning the thermally assisted magnetic head 181, the thermally assisted magnetic head 181 has also the same operation and effect, similar with the thermally assisted magnetic head 180.

Modified Example 3

Figure 29:
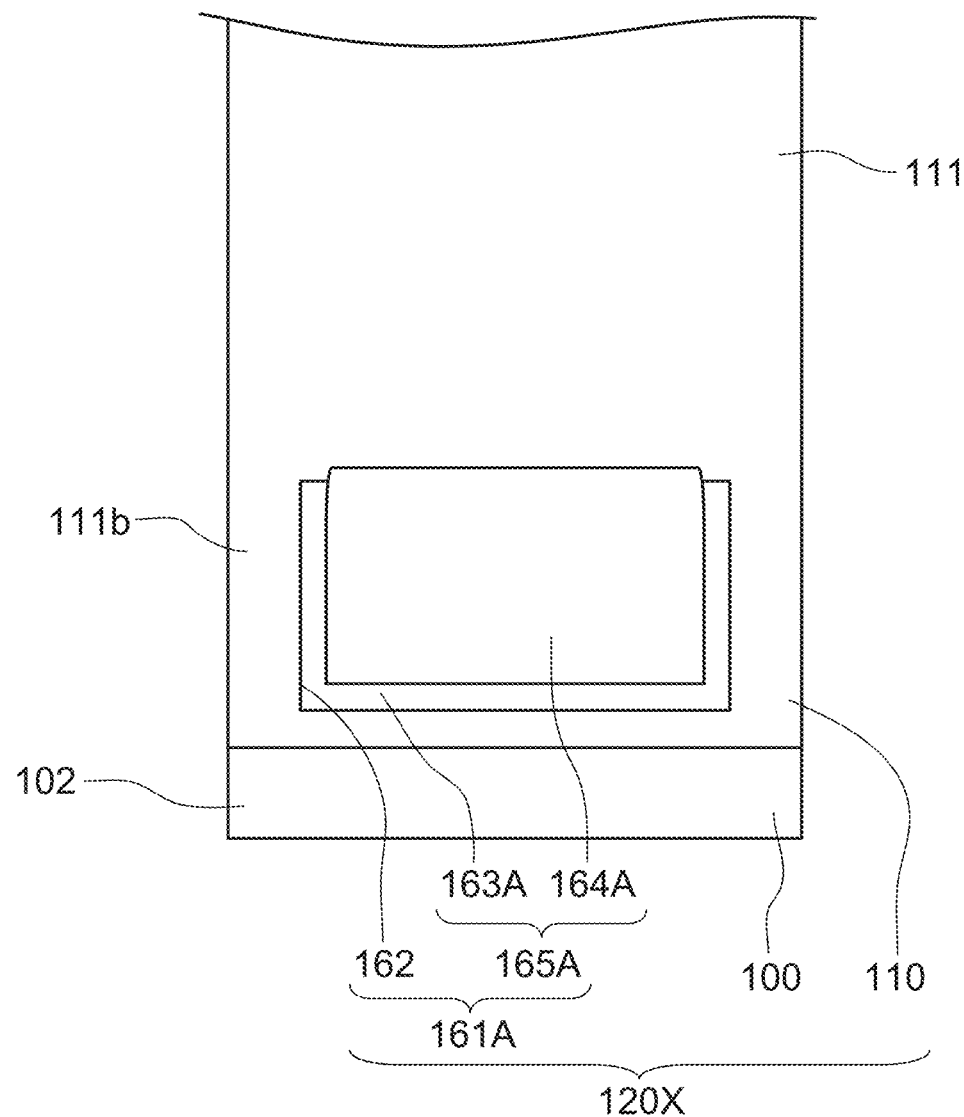
FIG. 29 is a plan view showing the principal part, in the light source-placing surface side, of the slider according to another modified example.

Next, a slider 120X, according to the modified example, will be explained with reference to FIG. 29. The slider 120X is different in that it has a light source-cavity 161A instead of the light source-cavity 161, as compared with the slider 120.

The light source-cavity 161A is different in that it has a bottom part 165A instead of the bottom part 165, as compared with the light source-cavity 161. The bottom part 165A is different in that it has a flat bottom part 163A and a deep bottom part 164A instead of the flat bottom part 163 and the deep bottom part 164, as compared with the bottom part 165.

In case of the bottom part 165, the flat bottom part 163 is formed so as to surround the entire deep bottom part 164. To the contrary, in case of the bottom part 165A, the flat bottom part 163A is formed so as to surround the deep bottom part 164A in the three directions, not entirely. The flat bottom part 163A is formed in a modified C-figure shape in a plan view. Even if the slider 120X is used, the emission part gap is adjusted similar with the case which the slider 120 is used. Therefore, the thermally assisted magnetic head (not illustrated), having the slider 120X, has the same operation and effect, similar with the thermally assisted magnetic head 180.

Modified Example 4

Next, the classification step, according to the modified example, will be explained with reference to FIG. 30. In case of the above-described classification step, when the shift-sizes dx have larger sizes than the gap reference value, the light source-units 160 are classified into any one of the middle group 160M or the large group 160L.

In case of the classification step according to the modified example, at least three groups, including the middle group 160M, the large group 160L and a more-large group 160XL, are prepared as the gap-adjustable groups.

Figure 30:
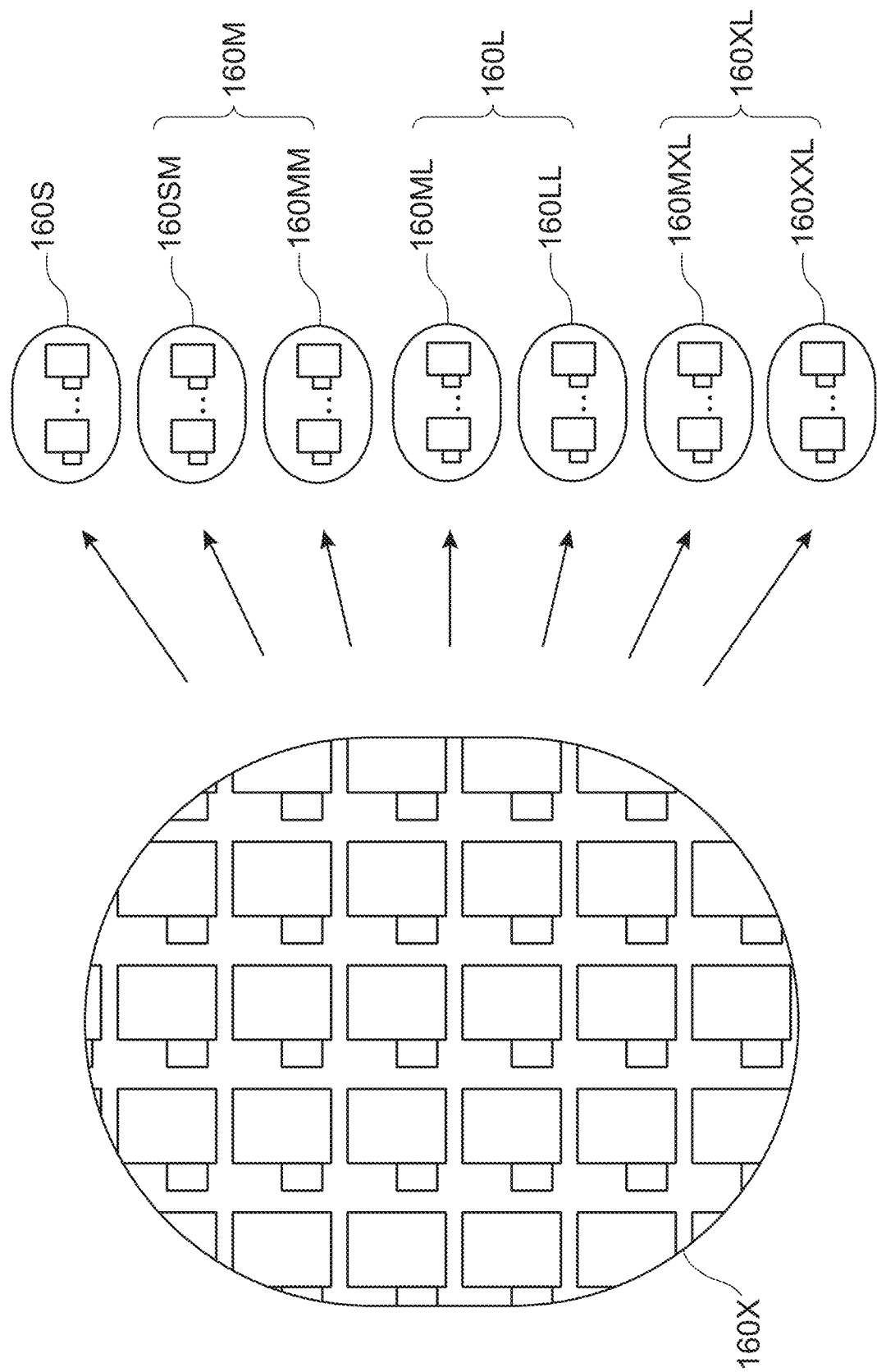
FIG. 30 is a view schematically showing the classification step according to the modified example.
Figure 31:
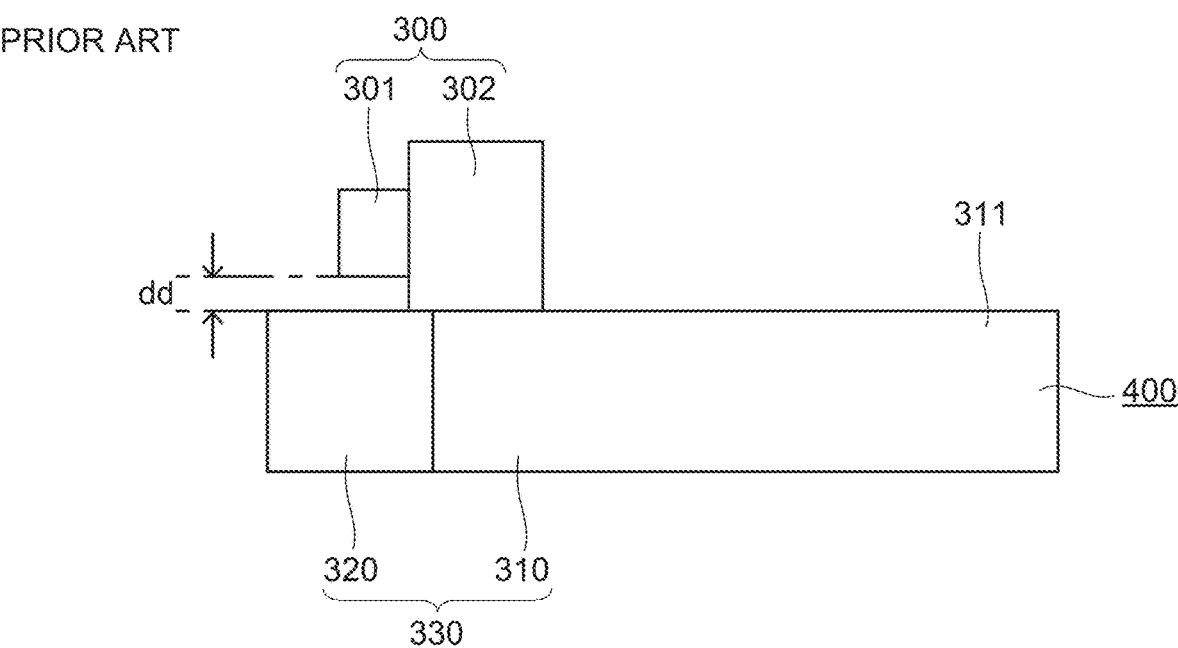
FIG. 31 is a side elevation view illustrating a conventional thermally assisted magnetic head.
Figure 33:
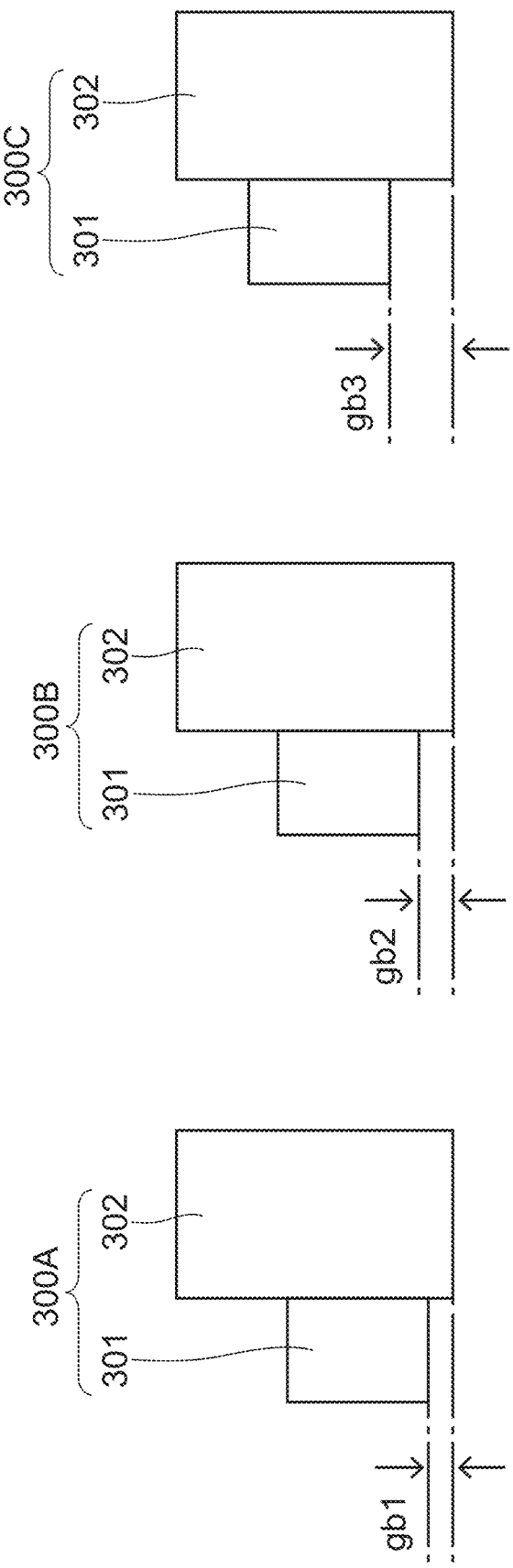
FIG. 33 is a side elevation view showing three kinds of light source-units respectively having different shift-sizes.

Further, as illustrated in FIG. 30, the middle group 160M, the large group 160L and the more-large group 160XL are respectively classified into two groups. Namely, in case of the classification step according to the modified example, six groups, including two middle groups 160SM, 160MM, two large groups 160ML, 160LL, two more-large groups 160MXL, 160XXL, are prepared as the gap-adjustable groups.

In FIG. 30, six gap-adjustable groups are prepared in total, though, it is possible that more than six groups are prepared. Then, in case of the classification step according to the modified example, when the shift-sizes dx have larger sizes than the gap reference value, the light source-units 160 are classified into any one of the middle groups 160SM, 160MM, the large groups 160ML, 160LL and the more-large groups 160MXL, 160XXL. Further, in the light source-cavity forming step, six cavity-sliders, respectively having the light source-cavities (for example, light source-cavities 161) with the depths in accordance with the respective gap-adjustable groups, are formed, in accordance with the case which six gap-adjustable groups are prepared.

When the classification step is performed as described-above, the gap-adjustable groups are subdivided minutely. Therefore, the emission part gap-adjustment is performed minutely.

Example

Inventers of the present invention measured electric current value, which flow the laser diodes of the following three types e1, e2, e3 of thermally assisted magnetic heads, for confirmation of the reduction effects of current, needed for heating by the laser diode 130.

e1 thermally assisted magnetic head having the light source-unit 160sm and the slider 121 e2 thermally assisted magnetic head having the light source-unit 160md and the slider 121 e3 thermally assisted magnetic head having the light source-unit 160md and the slider 120

The "e1" shows the thermally assisted magnetic head, which the shift-size is the gap reference value or less, the emission part gap-adjustment is unnecessary, as illustrated in FIG. 21.

The "e2" shows the thermally assisted magnetic head, which the shift-size is larger than the gap reference value, but the emission part gap-adjustment is not performed.

The "e3" shows the thermally assisted magnetic head (the thermally assisted magnetic head 180 according to the present invention), which the shift-size is larger than the gap reference value, therefore the emission part gap-adjustment is performed, as illustrated in FIG. 21.

Figure 24:
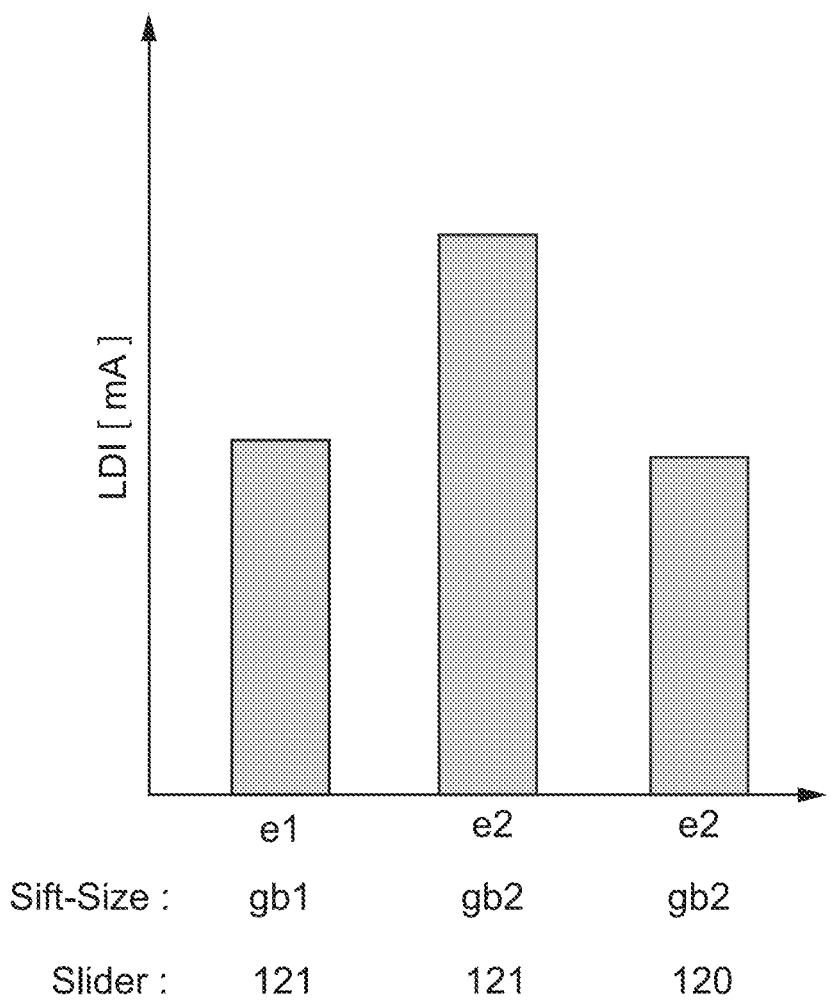
FIG. 24 is a graph showing magnitudes of measured LD current of three kinds of the thermally assisted magnetic head.

FIG. 24 shows the currents ("LD current", also referred to "LDI"), needed for heating by the laser diode 130, when data recording is performed, concerning the respective thermally assisted magnetic heads, shown by e1, e2, e3.

In case of the thermally assisted magnetic head shown by e1, the shift-size is gap reference value or less though, in case of the thermally assisted magnetic heads shown by e2, e3, the shift-sizes are larger than the gap reference value. Therefore, as illustrated in FIG. 24, the LD current of e2 is larger than the LD current of e1.

In case of the thermally assisted magnetic head shown by e3, the shift-size is larger than the gap reference value, similar with the thermally assisted magnetic head shown by e2.

However, in case of the thermally assisted magnetic head shown by e3, because it has the slider 120, the emission part gap-adjustment is performed. Therefore, the LD current of e3 is reduced into the about magnitude of the LD current of e1. Accordingly, even if the light source unit having shift-size, larger than the gap reference value, the LD current is lowered by using the slider 120.

(Embodiments of Head Gimbal Assembly and Hard Disk Drive)

Next, embodiments of the head gimbal assembly and hard disk drive will now be explained with reference to FIG. 27 to FIG. 28.

Figure 27:
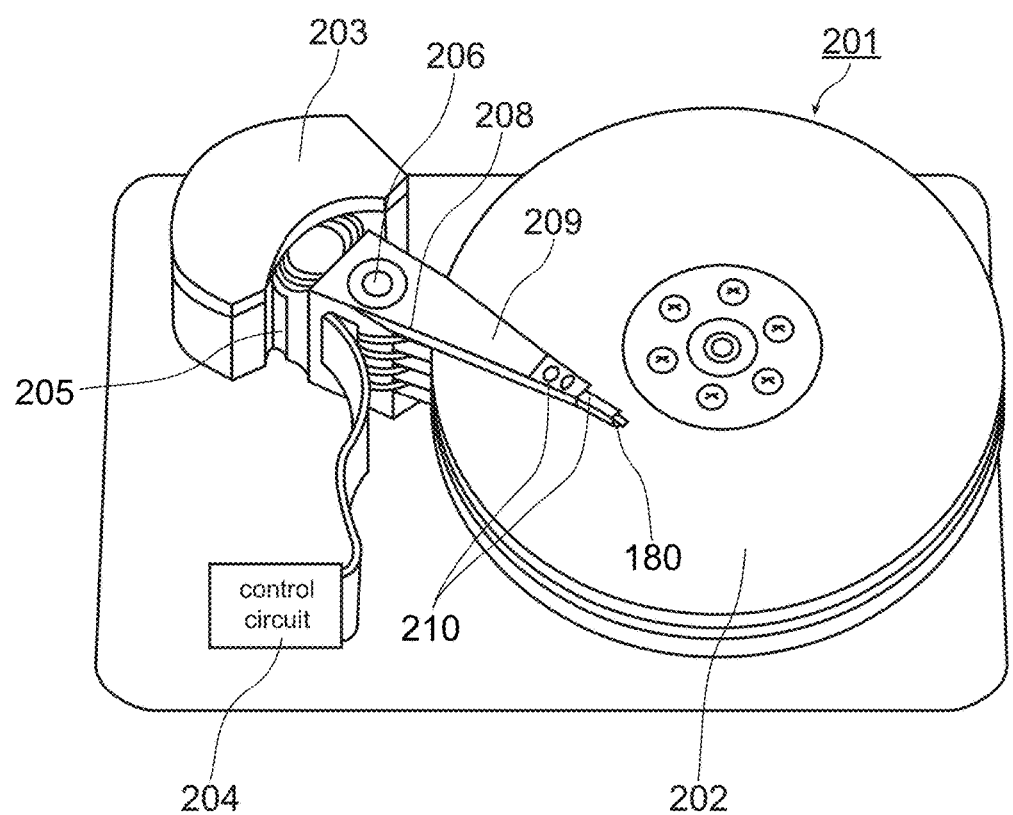
FIG. 27 is a perspective view illustrating a hard disk drive equipped with the thermally assisted magnetic head in FIG. 1.

FIG. 27 is a perspective view showing a hard disk drive 201 equipped with the above-mentioned thermally assisted magnetic head 180. The hard disk drive 201 includes a hard disk (magnetic recording medium) 202 rotating at a high speed and a head gimbal assembly (HGA) 210. The hard disk drive 201 is an apparatus which actuates the HGA 210, so as to record/reproduce data onto/from recording surfaces of the hard disk 202. The hard disk 202 has a plurality of (4 in the drawing) platters. Each platter has a recording surface opposing its corresponding the thermally assisted magnetic head 180.

The hard disk drive 201 positions the slider 120 on a track by an assembly carriage device 203. Further, the hard disk drive 201 has a plurality of drive arms 209. The drive arms pivot about a pivot bearing shaft 206 by means of a voice coil motor (VCM) 205, and are stacked in a direction along the pivot bearing shaft 206. Further, the HGA 210 is attached to the tip of each drive arm.

Further, the hard disk drive 201 has a control circuit 204 controlling recording/reproducing and the generation of light by the laser diode 130.

Figure 28:
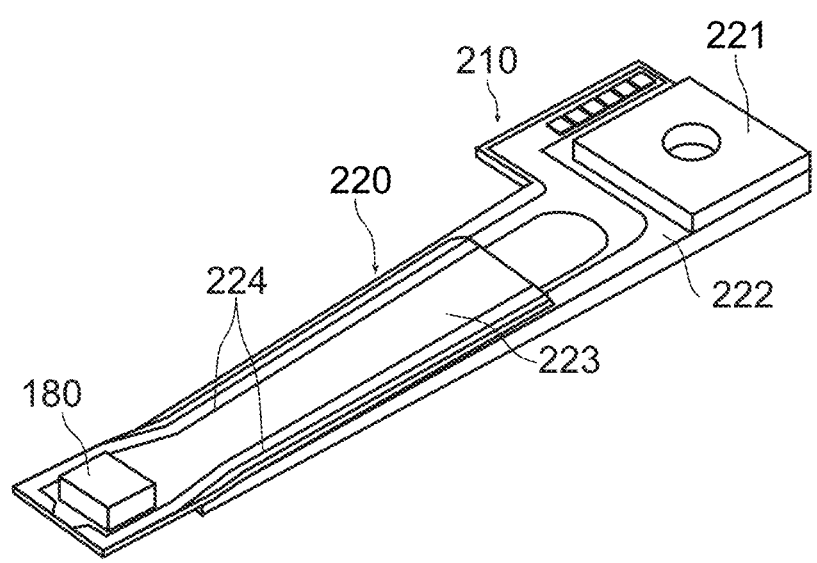
FIG. 28 is a perspective view illustrating a rear side of the HGA.

FIG. 28 is a perspective view illustrating a rear surface side of the HGA 210. In the HGA 210, the thermally assisted magnetic head 180 is fixed to a tip portion of a suspension 220. Further, in the HGA 210, one end portion of a wiring member 224 is electrically connected to a terminal electrode of the slider 120.

The suspension 220 has a load beam 222, a base plate 221 provided at a base portion of the load beam 222, a flexure 223 fixed to and supported on the load beam 222 from the tip end side to the front side of the base plate 221 and having elasticity, and the wiring member 224. The wiring member 224 has a lead conductor and connection pads electrically connected to both ends of the lead conductor.

In the hard disk drive 201, when the HGA 210 is rotated, the slider 120 moves in a radial direction of the hard disk 202, i.e., a direction traversing track lines.

The aforementioned HGA 210 and hard disk drive 201 have the thermally assisted magnetic head 180, thereby usage efficiency of the laser light is able to be enhanced.

Though the above-mentioned embodiments explain a type in which a thin-film coil is wound like a flat spiral about the main magnetic pole layer by way of example, the present invention is also applicable to a type in which the thin-film coil is wound helically about the main magnetic pole layer.

This invention is not limited to the foregoing embodiments but various changes and modifications of its components may be made without departing from the scope of the present invention. Besides, it is clear that various embodiments and modified examples of the present invention can be carried out on the basis of the foregoing explanation. Therefore, the present invention can be carried out in modes other than the above-mentioned best modes within the scope equivalent to the following claims.

What is claimed is:

1. A thermally assisted magnetic head comprising:
   a slider; and
   a light source-unit joined to the slider,
   wherein the slider comprises a slider substrate and a magnetic head part formed on the slider substrate,
   wherein the light source-unit comprises a LD-having sub-mount including a laser diode and a sub-mount,
      wherein the sub-mount has a size larger than the laser diode,
      wherein the laser diode is joined to the sub-mount,
   wherein the magnetic head part comprises a medium-opposing surface opposing a magnetic recording medium, a light source-opposing surface arranged on a rear side of the medium-opposing surface and a waveguide which guides laser light, output from the laser diode, from the light source-opposing surface to the medium-opposing surface,
   wherein the slider substrate comprises a light source-cavity formed in a light source-placing surface on which the light source-unit is placed,
   wherein the light source-cavity comprises an opening concave part being formed larger than a mount bottom surface, of the sub-mount, being formed in the light source-placing surface side,
   wherein the mount bottom surface of the LD-having sub-mount is inserted into the opening concave part to be joined to the light source-cavity so that no part of the laser diode enters into the light source-cavity.

2. The thermally assisted magnetic head according to claim 1,
   wherein the light source-cavity comprises a flat bottom part, having a flat surface, which is formed inside the opening concave part,
   wherein the mount bottom surface is joined to the flat bottom part,
      wherein the laser diode comprises a side surface, including an emission part which laser light is emitted,
      wherein the side surface entirely opposes to the light source-opposing surface.

3. The thermally assisted magnetic head according to claim 2,
   wherein the light source-cavity comprises a step-formed structure, which a deep bottom part, being formed deeper than the flat bottom part, is formed in the flat bottom part.

4. The thermally assisted magnetic head according to claim 3,
   wherein the flat bottom part is formed in a peripheral part of the deep bottom part so as to surround the deep bottom part.

5. The thermally assisted magnetic head according to claim 3, further comprising:
   a solder part, which is accommodated in the deep bottom part,
   wherein the mount bottom surface is joined to the deep bottom part with the solder part.

6. The thermally assisted magnetic head according to claim 1,
   wherein the mount bottom surface is joined to the light source-cavity, thereby a space between the laser diode and the light source-opposing surface is narrowed than the case which the mount bottom surface is joined to the light source-placing surface.

7. A method of manufacturing the thermally assisted magnetic head, having a slider and a light source-unit being joined to the slider, comprising:
   a light source-unit manufacturing step for manufacturing a plurality of light source-units, using a sub-mount substrate, on which a plurality of mount regions, for respectively manufacturing sub-mounts, are formed, and joining laser diodes to the respective mount regions of the sub-mount substrate;
   a classification step for classifying the light source-units, being manufactured by the light source-unit manufacturing step, into any one of a conformable group or a gap-adjustable group, in accordance with shift-sizes, the shift-sizes are spaces from mount bottom surfaces of the sub-mounts to emission parts of the laser diodes, the conformable group is a group which the shift-sizes are gap reference value or less, the gap-adjustable group is a group which the shift-sizes are larger than the gap reference value;

a cavity-slider manufacturing step for manufacturing cavity-sliders having light source-cavities, as the sliders; and an insertion joining step for inserting the mount bottom surfaces of gap-adjustable units, being classified into the gap-adjustable group, of the light source-units, into the light source-cavities of the cavity-sliders to join the gap-adjustable units to the cavity-sliders.

8. The method of manufacturing the thermally assisted magnetic head according to claim 7, further comprising:
a normal-slider manufacturing step for manufacturing normal-sliders, not having the light source-cavities; and
a surface joining step, which conformable units, being classified into the conformable group, of the light source-units, are joined to the surfaces of the normal-sliders.

9. The method of manufacturing the thermally assisted magnetic head according to claim 7,
wherein the cavity-slider manufacturing step has a light source-cavity forming step for forming the light source-cavities,
wherein the light source-cavity forming step comprises a first concave part forming step for forming opening concave parts and flat bottom parts, and a second concave part forming step for forming deep bottom parts, formed deeper than the flat bottom parts.

10. The method of manufacturing the thermally assisted magnetic head according to claim 9,
wherein the light source-cavity forming step is performed so that a plurality of cavity-sliders, including first cavity-sliders which the opening concave parts are formed in a first depth and second cavity-sliders which the opening concave parts are formed in a second depth deeper than the first depth, are formed.

11. The method of manufacturing the thermally assisted magnetic head according to claim 10,
wherein the classification step is performed so that the light source-units, being classified into the gap-adjustable group, are classified into any one of a middle group or a large group, in accordance with the respective shift-sizes, the middle group is a group which the shift-sizes are a classification reference value or less, the large group is a group which the shift-sizes are larger than the classification reference value.

12. The method of manufacturing the thermally assisted magnetic head according to claim 11,
wherein the classification step is performed so that at least three groups, including the middle group and the large group, are prepared as the gap-adjustable groups, the light source-units, being classified into the gap-adjustable groups, are classified into any one of the at least three gap-adjustable groups in accordance with the respective shift-sizes.

13. The method of manufacturing the thermally assisted magnetic head according to claim 11,
wherein the insertion joining step is performed so that middle units, of the light source-units, being classified into the middle group are joined to the first cavity-sliders, and large units, of the light source-units, being classified into the large group are joined to the second cavity-sliders.

14. The method of manufacturing the thermally assisted magnetic head according to claim 9, further comprising:
a solder accommodating step for accommodating solder in the deep bottom part,
wherein the insertion joining step is performed so that the mount bottom surfaces are joined to the light source-cavities by solder parts made of solder being accommodated by the solder accommodating step.

15. The method of manufacturing the thermally assisted magnetic head according to claim 9,
wherein the cavity-slider manufacturing step comprises a magnetic head substrate manufacturing step for manufacturing a magnetic head substrate which a plurality of magnetic head parts, having recording head, are formed on a slider substrate for forming the slider, and a bar-like member manufacturing step for forming a plurality of bar-like members respectively having the magnetic head parts by cutting the magnetic head substrate,
wherein the light source-cavity forming step is performed so that the light source-cavities are formed on the respective bar-like members.

16. A head gimbal assembly comprising a thermally assisted magnetic head,
wherein the thermally assisted magnetic head comprising:
a slider; and
a light source-unit joined to the slider,
wherein the slider comprises a slider substrate and a magnetic head part formed on the slider substrate,
wherein the light source-unit comprises a LD-having sub-mount including a laser diode and a sub-mount,
wherein the sub-mount has a size larger than the laser diode,
wherein the laser diode is joined to the sub-mount,
wherein the magnetic head part comprises a medium-opposing surface opposing a magnetic recording medium, a light source-opposing surface arranged on a rear side of the medium-opposing surface and a waveguide which guides laser light, output from the laser diode, from the light source-opposing surface to the medium-opposing surface,
wherein the slider substrate comprises a light source-cavity formed in a light source-placing surface on which the light source-unit is placed,
wherein the light source-cavity comprises an opening concave part being formed larger than a mount bottom surface, of the sub-mount, being formed in the light source-placing surface side,
wherein the mount bottom surface of the LD-having sub-mount is inserted into the opening concave part to be joined to the light source-cavity so that no part of the laser diode enters into the light source-cavity.

17. A hard disk drive comprising a head gimbal assembly having a thermally assisted magnetic head, and a magnetic recording medium opposing the thermally assisted magnetic head,
wherein the thermally assisted magnetic head comprising:
a slider; and
a light source-unit joined to the slider,
wherein the slider comprises a slider substrate and a magnetic head part formed on the slider substrate,
wherein the light source-unit comprises a LD-having sub-mount including a laser diode and a sub-mount,
wherein the sub-mount has a size larger than the laser diode,
wherein the laser diode is joined to the sub-mount,
wherein the magnetic head part comprises a medium-opposing surface opposing a magnetic recording medium, a light source-opposing surface arranged on a rear side of the medium-opposing surface and a waveguide which guides laser light, output from the laser diode, from the light source-opposing surface to the medium-opposing surface, wherein the slider substrate comprises a light source-cavity formed in a light source-placing surface on which the light source-unit is placed, wherein the light source-cavity comprises an opening concave part being formed larger than a mount bottom surface, of the sub-mount, being formed in the light source-placing surface side, wherein the mount bottom surface of the LD-having sub-mount is inserted into the opening concave part to be joined to the light source-cavity so that no part of the laser diode enters into the light source-cavity.

* * * * *